US009491020B2

(12) United States Patent
Han et al.

(10) Patent No.: US 9,491,020 B2
(45) Date of Patent: Nov. 8, 2016

(54) SIGNAL TRANSMISSION METHOD AND DEVICE IN WIRELESS COMMUNICATION SYSTEM

(75) Inventors: Seung Hee Han, Anyang-si (KR); Jin Sam Kwak, Anyang-si (KR); Jae Hoon Chung, Anyang-si (KR); Min Seok Noh, Anyang-si (KR); Yeong Hyeon Kwon, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 90 days.

(21) Appl. No.: 13/125,570

(22) PCT Filed: Oct. 20, 2009

(86) PCT No.: PCT/KR2009/006051
§ 371 (c)(1),
(2), (4) Date: Apr. 21, 2011

(87) PCT Pub. No.: WO2010/047512
PCT Pub. Date: Apr. 29, 2010

(65) Prior Publication Data
US 2011/0200002 A1 Aug. 18, 2011

Related U.S. Application Data

(60) Provisional application No. 61/107,346, filed on Oct. 22, 2008, provisional application No. 61/108,016, filed on Oct. 23, 2008, provisional application No. 61/108,544, filed on Oct. 26, 2008, provisional application No. 61/109,183, filed on Oct. 29, 2008, provisional application No. 61/111,736, filed on Nov. 6, 2008.

(30) Foreign Application Priority Data

Aug. 11, 2009 (KR) .................. 10-2009-0073596

(51) Int. Cl.
*H04J 1/00* (2006.01)
*H04L 27/26* (2006.01)
*H04L 5/00* (2006.01)

(52) U.S. Cl.
CPC .......... *H04L 27/261* (2013.01); *H04L 5/0051* (2013.01)

(58) Field of Classification Search
CPC ............ H04W 72/00; H04W 72/40–72/0473; H04W 72/12–72/1221; H04W 72/1278–72/1294; H04W 76/021; H04B 14/08; H04L 5/0005–5/0041; H04L 5/0091–5/0098
USPC .................. 370/310–350, 208, 210; 455/501
See application file for complete search history.

(56) References Cited

U.S. PATENT DOCUMENTS

2008/0212462 A1* 9/2008 Ahn et al. ...................... 370/209
2008/0310540 A1* 12/2008 Tiirola et al. ................. 375/267

(Continued)

FOREIGN PATENT DOCUMENTS

JP 2007-523549 8/2007
JP 2008035158 2/2008

(Continued)

OTHER PUBLICATIONS

3rd Generation Partnership Project (3GPP), "Technical Specification Group Radio Access Network; Evolved Universal Terrestrial Radio Access (E-UTRA); Physical Channels and Modulation (Release 8)", 3GPP TS 36.211, V8.4.0, Sep. 2008, 78 pages.

(Continued)

*Primary Examiner* — Andrew Chriss
*Assistant Examiner* — Kenan Cehic
(74) *Attorney, Agent, or Firm* — Lee, Hong, Degerman, Kang & Walmey; Jonathan Kang; Michael Monaco

(57) ABSTRACT

Provided is a method and device for signal transmission having good PAPR/CM characteristics. With regard to one aspect of said method, the method for transmitting a reference signal in a wireless communication signal comprises a step wherein a reference signal sequence is generated, a step wherein said reference signal sequence is divided with respect to each of multiple sub-blocks, a step wherein each of said plurality of divided reference signal sequence is subject to circular shifting, and a step wherein said plurality of circular shifted reference signals are transmitted via said plurality of sub-blocks.

21 Claims, 26 Drawing Sheets

(56) References Cited

U.S. PATENT DOCUMENTS

| | | | |
|---|---|---|---|
| 2009/0028260 A1* | 1/2009 | Xiao et al. | 375/260 |
| 2009/0116599 A1* | 5/2009 | McCoy | 375/362 |
| 2009/0129259 A1* | 5/2009 | Malladi et al. | 370/210 |
| 2009/0168730 A1* | 7/2009 | Baum et al. | 370/336 |
| 2009/0207797 A1* | 8/2009 | Shen et al. | 370/329 |
| 2009/0245148 A1* | 10/2009 | McCoy | 370/310 |
| 2009/0279493 A1* | 11/2009 | Gaal et al. | 370/329 |
| 2010/0067496 A1* | 3/2010 | Choi | 370/336 |
| 2010/0118773 A1* | 5/2010 | Kawamura et al. | 370/328 |
| 2010/0142490 A1* | 6/2010 | Kim et al. | 370/335 |
| 2011/0317649 A1* | 12/2011 | Papasakellariou et al. | 370/329 |
| 2012/0201275 A1* | 8/2012 | Tiirola et al. | 375/135 |
| 2012/0213193 A1* | 8/2012 | Kwon et al. | 370/330 |
| 2015/0016402 A1* | 1/2015 | Wager | H04L 5/0007 370/329 |

FOREIGN PATENT DOCUMENTS

| | | |
|---|---|---|
| JP | 2008-236417 | 10/2008 |
| JP | 2008236433 | 10/2008 |
| KR | 10-2006-0040180 A | 5/2006 |
| KR | 10-2007-0101808 A | 10/2007 |
| KR | 10-2008-0033060 A | 4/2008 |
| KR | 10-2008-0054164 | 6/2008 |
| KR | 10-2008-0086934 | 9/2008 |
| WO | 2007020943 | 2/2007 |
| WO | 2007/148796 | 12/2007 |
| WO | 2008041650 | 4/2008 |
| WO | 2008-072899 A2 | 6/2008 |
| WO | 2008115110 | 9/2008 |

OTHER PUBLICATIONS

Japan Patent Office Application Serial No. 2011-533099, Office Action dated Jan. 18, 2013, 3 pages.
3rd Generation Partnership Project (3GPP), "Technical Specification Group Radio Access Network; Evolved Universal Terrestrial Radio Access (E-UTRA); Physical Channels and Modulation (Release 8)," 3GPP TS 36.211 V8.4.0, Sep. 2008, 78 pages.
Japan Patent Office Application Serial No. 2011-533099, Notice of Allowance dated Nov. 18, 2013, 3 pages.
Izuka, et al., "Reduction of Peak Power for Up-link in SCS-MC-CDM System," B-5-98, Sep. 2004, p. 432.
Japan Patent Office Application Serial No. 2013-214386, Office Action dated Sep. 8, 2014, 2 pages.
Korean Intellectual Property Office Application Serial No. 10-2009-0073596, Office Action dated Apr. 20, 2015, 4 pages.

* cited by examiner

Antenna 0 p(1)　　　　　p(2)　　　　　　　p(Nsb)

| Subblock #1 | Subblock #2 | ··· | Subblock #Nsb |

SIGNAL TRANSMISSION METHOD AND DEVICE IN WIRELESS COMMUNICATION SYSTEM

CROSS-REFERENCE TO RELATED APPLICATIONS

This application is the National Stage filing under 35 U.S.C. 371 of International Application No. PCT/KR2009/006051, filed on Oct. 20, 2009, which claims the benefit of earlier filing date and right of priority to Korean Application No. 10-2009-0073596, filed on Aug. 11, 2009, and also claims the benefit of U.S. Provisional Application Ser. No. 61/111,736, filed on Nov. 6, 2008, 61/109,183, filed on Oct. 29, 2008, 61/108,544, filed on Oct. 26, 2008, 61/108,016, filed on Oct. 23, 2008, and 61/107,346, filed on Oct. 22, 2008, the contents of which are all incorporated by reference herein in their entirety.

BACKGROUND OF THE INVENTION

1. Field of the Invention

The present invention relates to wireless communications, and more particularly, to a method and device for signal transmission in a wireless communication system.

2. Related Art

In next generation multimedia mobile communication systems, there is a demand for a system capable of processing and transmitting a variety of information (e.g., video and radio data) in addition to the early-stage voice service. The wireless communication system is designed for the purpose of providing reliable communication to a plurality of users irrespective of their locations and mobility. However, a wireless channel has an abnormal characteristic such as a fading phenomenon caused by a path loss, noise, and multipath, an inter-symbol interference (ISI), a Doppler effect caused by mobility of a mobile station (MS), etc. Various techniques have been developed to overcome the abnormal characteristic of the wireless channel and to increase reliability of wireless communication.

In general, a sequence is used for various channels and signals such as a synchronization signal, a scrambling code, etc. The sequence used in the wireless communication system must satisfy the following properties.

(1) Good correlation property for providing high detection capability (2) Low peak-to-average power ratio (PAPR)/cubic metric (CM) for increasing efficiency of a power amplifier (3) High capacity of a sequence for facilitating various information transmission or cell planning.

A reference signal (RS) is used in channel estimation. The channel estimation is required for user scheduling and/or data demodulation. The RS is a signal which is known to both a transmitter and a receiver, and is also referred to as a pilot.

In order to obtain a gain in channel estimation capability, a signal consisting of only RSs such as a preamble can be used. Since density of the RSs is high, the channel estimation capability can be improved. In general, the RSs are transmitted together with data subcarriers to increase a data transfer amount. However, this method may result in deterioration of the channel estimation performance in comparison with the former method since density of the RSs is decreased.

PAPR/CM characteristics are one of important factors in the signal design in association with battery consumption. A method and device for signal transmission having a low PAPR/CM characteristic are required.

SUMMARY OF THE INVENTION

The present invention provides a method and device for transmitting a signal having a good peak-to-average power ratio (PAPR)/cubic metric (CM) characteristic.

The present invention also provides a method and device for transmitting a reference signal having a good PAPR/CM characteristic.

In an aspect,

In another aspect,

According to the present invention, a signal having a low peak-to-average power ratio (PAPR)/cubic metric (CM) characteristic can be attained. The present invention is applicable to various signals such as a reference signal, a synchronization signal, etc.

DESCRIPTION OF EXEMPLARY EMBODIMENTS

A technology below can be used in a variety of wireless communication systems, such as Code Division Multiple Access (CDMA), Frequency Division Multiple Access (FDMA), Time Division Multiple Access (TDMA), Orthogonal Frequency Division Multiple Access (OFDMA), and Single Carrier Frequency Division Multiple Access (SC-FDMA). CDMA can be implemented using radio technology, such as Universal Terrestrial Radio Access (UTRA) or CDMA2000. TDMA can be implemented using radio technology, such as Global System for Mobile communications (GSM)/General Packet Radio Service (GPRS)/Enhanced Data Rates for GSM Evolution (EDGE). OFDMA can be implemented using radio technology, such as IEEE 802.11(Wi-Fi), IEEE 802.16(WiMAX), IEEE 802-20, or Evolved UTRA (E-UTRA). UTRA is part of a Universal Mobile Telecommunications System (UMTS). 3rd Generation Partnership Project (3GPP) Long Term Evolution (LET) is part of Evolved UMTS (E-UMTS) using Evolved-UMTS Terrestrial Radio Access (E-UTRA), and it adopts OFDMA in downlink (DL) and SC-FDMA in uplink (UL). LTE-A (Advanced) is the evolution of 3GPP LTE.

LTE/LTE-A is chiefly described as an example in order to clarify the description, but the technical spirit of the present invention is not limited to LTE/LTE-A.

Figure 1:
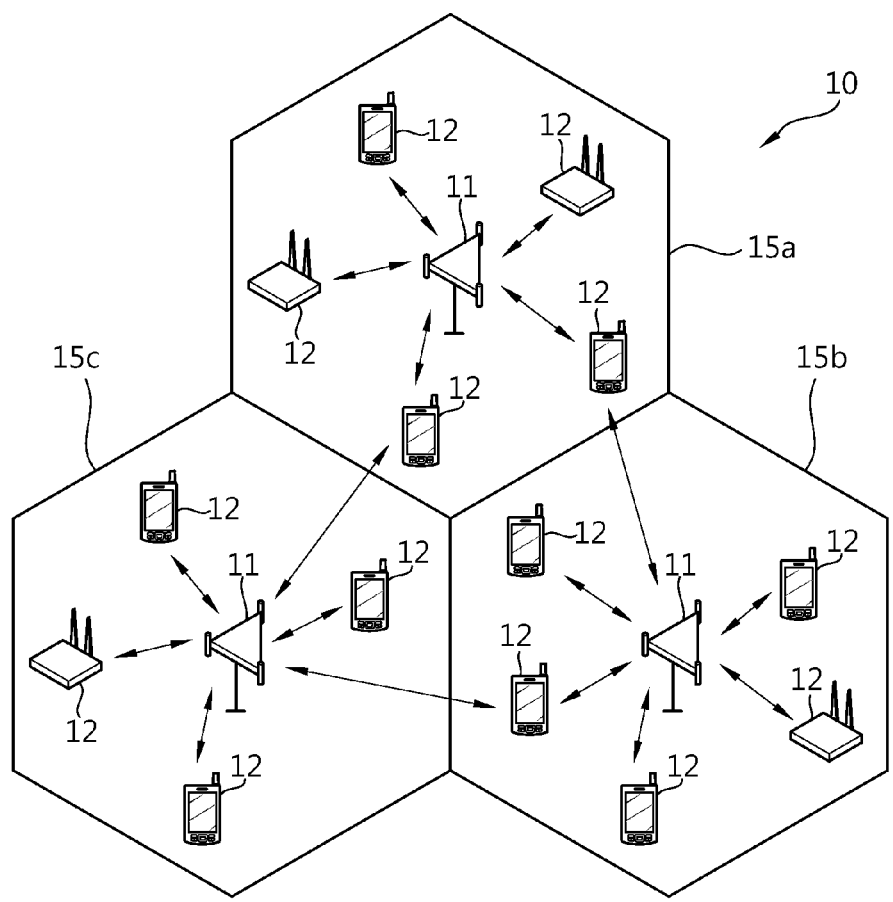
FIG. 1 shows a wireless communication system.

FIG. 1 shows a wireless communication system. Referring to FIG. 1, a wireless communication system 10 includes at least one base station (BS) 11. The BSs 11 provide communication services to specific geographical regions (generally referred to as cells) 15a, 15b, and 15c. The cell can be divided into a plurality of regions (referred to as sectors). A user equipment (UE) 12 may be fixed or mobile, and may be referred to as another terminology, such as a mobile station (MS), a user terminal (UT), a subscriber station (SS), a wireless device, a personal digital assistant (PDA), a wireless modem, a handheld device, etc. The BS 11 is generally a fixed station that communicates with the UE 12 and may be referred to as another terminology, such as an evolved node-B (eNB), a base transceiver system (BTS), an access point, etc.

Hereinafter, a downlink (DL) denotes a communication link from the BS to the UE, and an uplink (UL) denotes a communication link from the UE to the BS. In the DL, a transmitter may be a part of the BS, and a receiver may be a part of the UE. In the UL, the transmitter may be a part of the UE, and the receiver may be a part of the BS.

The wireless communication system can support multiple antennas. The transmitter can use a plurality of transmit antennas, and the receiver can use a plurality of receive antennas. The transmit antenna is a physical or logical antenna used to transmit one signal or stream. The receive antenna is a physical or logical antenna used to receive one signal or stream.

The wireless communication system can support multiple carriers. Spectrum aggregation (also referred to as bandwidth aggregation or carrier aggregation) is for supporting a plurality of carriers. This is a technique for effectively using fragmented small bands to obtain the same effect as when a band of a logically wide bandwidth is used by physically aggregating a plurality of bands in a frequency domain. The spectrum aggregation includes a technique for supporting a system bandwidth of 100 mega Hertz (MHz) by using multiple carriers even if, for example, the 3GPP LTE supports a bandwidth of up to 20 MHz, and a technique for allocating an asymmetric bandwidth between the UL and the DL. For example, when 5 carriers are assigned with a granularity of a carrier unit having a bandwidth of 20 MHz, up to 100 MHz can be supported.

Figure 2:
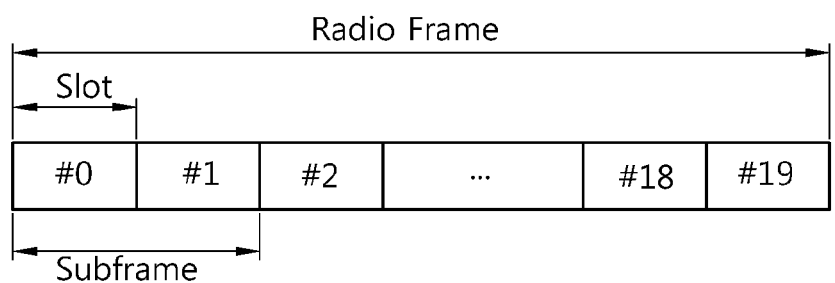
FIG. 2 shows a structure of a radio frame in 3rd generation partnership project (3GPP) long term evolution (LTE).

FIG. 2 shows a structure of a radio frame in $3^{rd}$ generation partnership project (3GPP) long term evolution (LTE). Section 5 of the 3GPP (3rd Generation Partnership Project) TS 36.211 V8.2.0 (2008-03) "Technical Specification Group Radio Access Network; Evolved Universal Terrestrial Radio Access (E-UTRA); Physical channels and modulation (Release 8)" may be incorporated herein by reference. The radio frame consists of 10 subframes, and one subframe consists of two slots. Slots in the radio frame are indexed with slot numbers #0 to #19. A time for transmitting one subframe is defined as a transmission time interval (TTI). The TTI can be regarded as a scheduling unit for data transmission. For example, one radio frame may have a length of 10 milliseconds (ms), one subframe may have a length of 1 ms, and one slot may have a length of 0.5 ms.

One slot may include a plurality of orthogonal frequency division multiplexing (OFDM) symbols in a time domain and includes a plurality of subcarriers in a frequency domain. Since the 3GPP LTE uses OFDMA in DL transmission, the OFDM symbol is for representing one symbol period, and can be referred to as other terms according to a multiple access scheme. For example, the OFDM symbol can also be referred to as an SC-FDMA symbol when SC-FDMA is used a UL multiple access scheme. A resource block (RB) is a resource allocation unit, and includes 12 contiguous subcarriers in one slot.

According to 3GPP LTE, one slot includes 7 OFDM symbols in case of a normal cyclic prefix (CP), and one slot includes 6 OFDM symbols in case of an extended CP.

Figure 3:
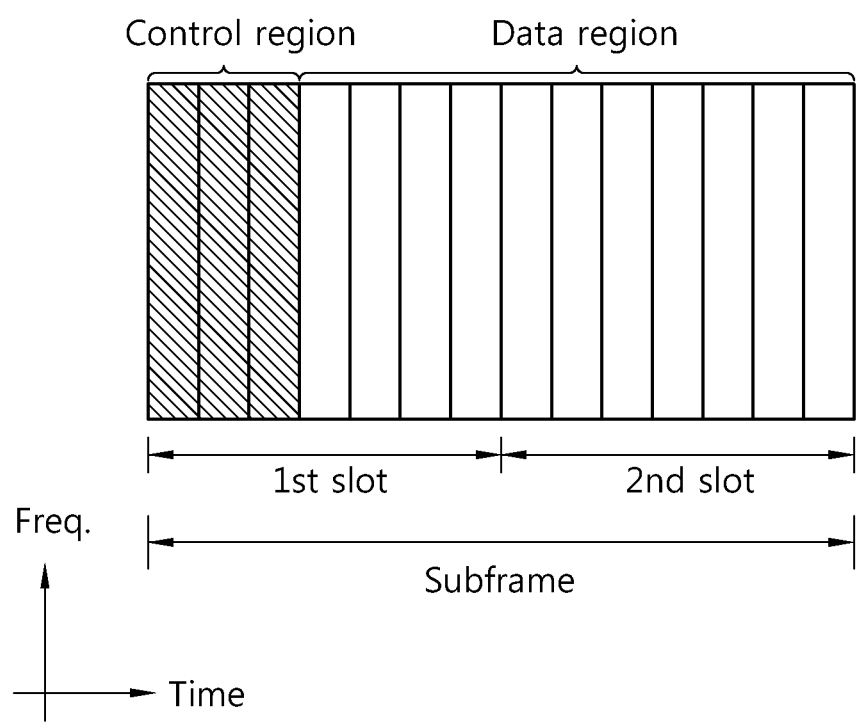
FIG. 3 shows a structure of a DL subframe in 3GPP LTE.

FIG. 3 shows a structure of a DL subframe in 3GPP LTE. The DL subframe includes two slots in a time domain. Each slot includes 7 OFDM symbols in a normal CP. A maximum of three OFDM symbols located in a front portion of a $1^{st}$ slot in a subframe correspond to a control region and the remaining OFDM symbols correspond to a data region. Control channels are allocated to the control region, and a physical downlink shared channel (PDSCH) is allocated to the data region.

Examples of DL control channels used in the 3GPP LET include a physical control format indicator channel (PCFICH), a physical downlink control channel (PDCCH), a physical hybrid-ARQ indicator channel (PHICH), etc. The PCFICH transmitted in a $1^{st}$ OFDM symbol of a subframe carries information regarding the number of OFDM symbols (i.e., a size of a control region) used for transmission of control channels in the subframe. The PHICH carries an acknowledgement (ACK)/not-acknowledgement (NACK) signal for a UL hybrid automatic repeat request (HARM). That is, the ACK/NACK signal for UL data transmitted by a UE is transmitted on the PHICH. Control information transmitted on the PDCCH is referred to as downlink control information (DCI). The DCI transmits UL resource assignment information, DL resource assignment information, a UL transmit power control (TPC) command for any UE groups, etc. The UE receives DL data through the PDSCH indicated by the PDCCH.

Figure 4:
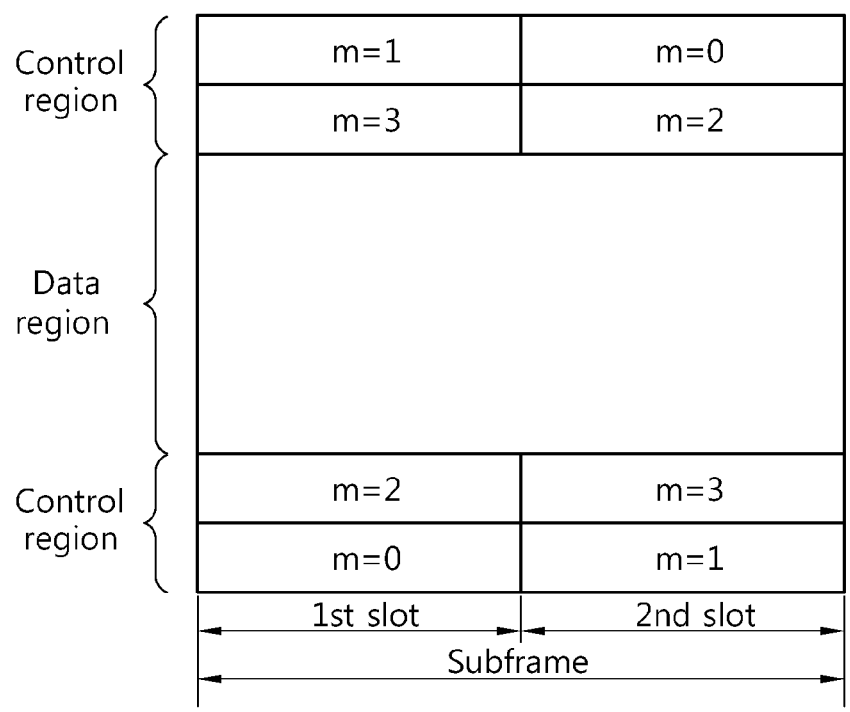
FIG. 4 shows a structure of a UL subframe in 3GPP LTE.

FIG. 4 shows a structure of a UL subframe in 3GPP LTE. The UL subframe can be divided into a control region and a data region. A physical uplink control channel (PUCCH) for carrying UL control information is allocated to the control region. A physical uplink shared channel (PUSCH)

for carrying user data is allocated to the data region. According to 3GPP TS 36.211 V8.2.0 (2008-03), to maintain a single carrier property, contiguous resource blocks in a frequency domain are allocated to one UE, and one UE cannot simultaneously transmit the PUCCH and the PUSCH.

In the subframe, the PUCCH for one UE is allocated in a resource block (RB) pair. RBs belonging to the RB pair occupy different subcarriers in each of $1^{st}$ and $2^{nd}$ slots. A frequency occupied by an RB belonging to an RB pair allocated to the PUCCH is changed at a slot boundary. When the UE transmits UL control information through different subcarriers according to a time, a frequency diversity gain can be attained. In FIG. 4, m denotes a location index indicating a frequency-domain location of an RB allocated to the PUCCH in the subframe.

Examples of UL control information transmitted on the PUCCH include a hybrid automatic repeat request (HARQ) acknowledgement (ACK)/negative acknowledgement (NACK) signal, a channel quality indicator (CQI) indicating a DL channel state, a scheduling request (SR) as a request for UL radio resource allocation, etc.

The PUSCH is mapped to an uplink shared channel (UL-SCH) which is a transport channel. UL data transmitted on the PUSCH may be a transport block which is a data block for the UL-SCH transmitted during TTI. The transport block may be user information. Alternatively, the UL data may be multiplexed data. The multiplexed data may be attained by multiplexing control information and the transport block for the UL-SCH. Examples of the control information multiplexed to the data include a CQI, a precoding matrix indicator (PMI), a HARQ ACK/NACK signal, a rank indicator (RI), etc.

A reference signal (RS) is used for channel estimation. The channel estimation is required for user scheduling and/or data demodulation. The RS is a signal known to both a transmitter and a receiver, and is also referred to as a pilot. A subcarrier used in RS transmission is referred to as an RS subcarrier. A resource element used in data transmission is referred to as a data subcarrier.

Any sequence can be used as a sequence used for the RS (hereinafter, referred to as an RS sequence) without particular restrictions. The RS sequence may be a phase shift keying (PSK)-based computer generated sequence. Examples of the PSK include binary phase shift keying (BPSK), quadrature phase shift keying (QPSK), etc. Alternatively, the RS sequence may be a constant amplitude zero auto-correlation (CAZAC) sequence. Examples of the CAZAC sequence include a Zadoff-Chu (ZC)-based sequence, a ZC sequence with cyclic extension, a ZC sequence with truncation, etc. Alternatively, the RS sequence may be a pseudo-random (PN) sequence. Example of the PN sequence include an m-sequence, a computer generated sequence, a Gold sequence, a Kasami sequence, etc. In addition, the RS sequence may be a cyclically shifted sequence.

The RS can be classified into a common RS and a dedicated RS. The common RS is an RS transmitted to all UEs in a cell, and is used for channel estimation. The dedicated RS is an RS received by a specific UE or a specific UE group in the cell, and is primarily used for data demodulation by the specific UE or the specific UE group.

Now, a DL RS in 3GPP LTE is described.

Figure 5:
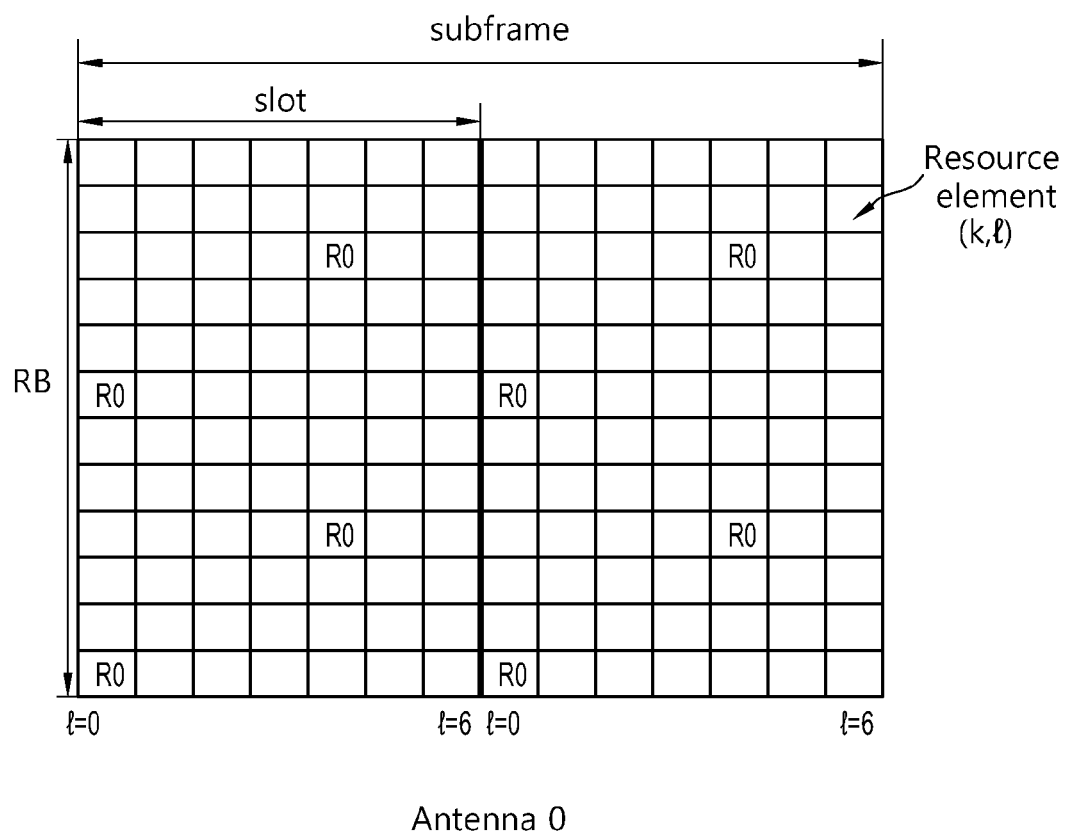
FIG. 5 shows an example of a common RS structure when a BS uses one antenna.
Figure 6:
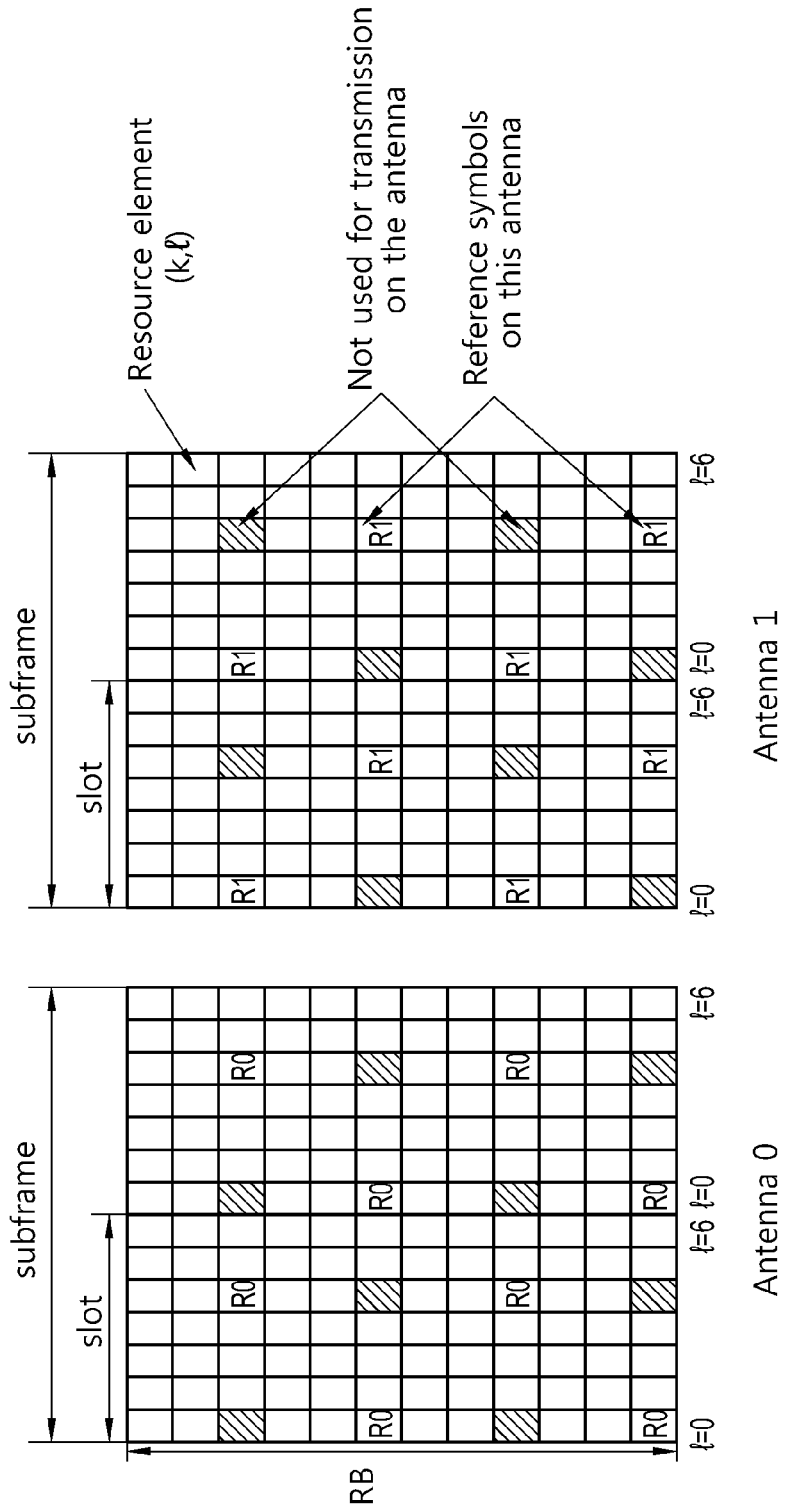
FIG. 6 shows an example of a common RS structure when a BS uses 2 antennas.
Figure 7:
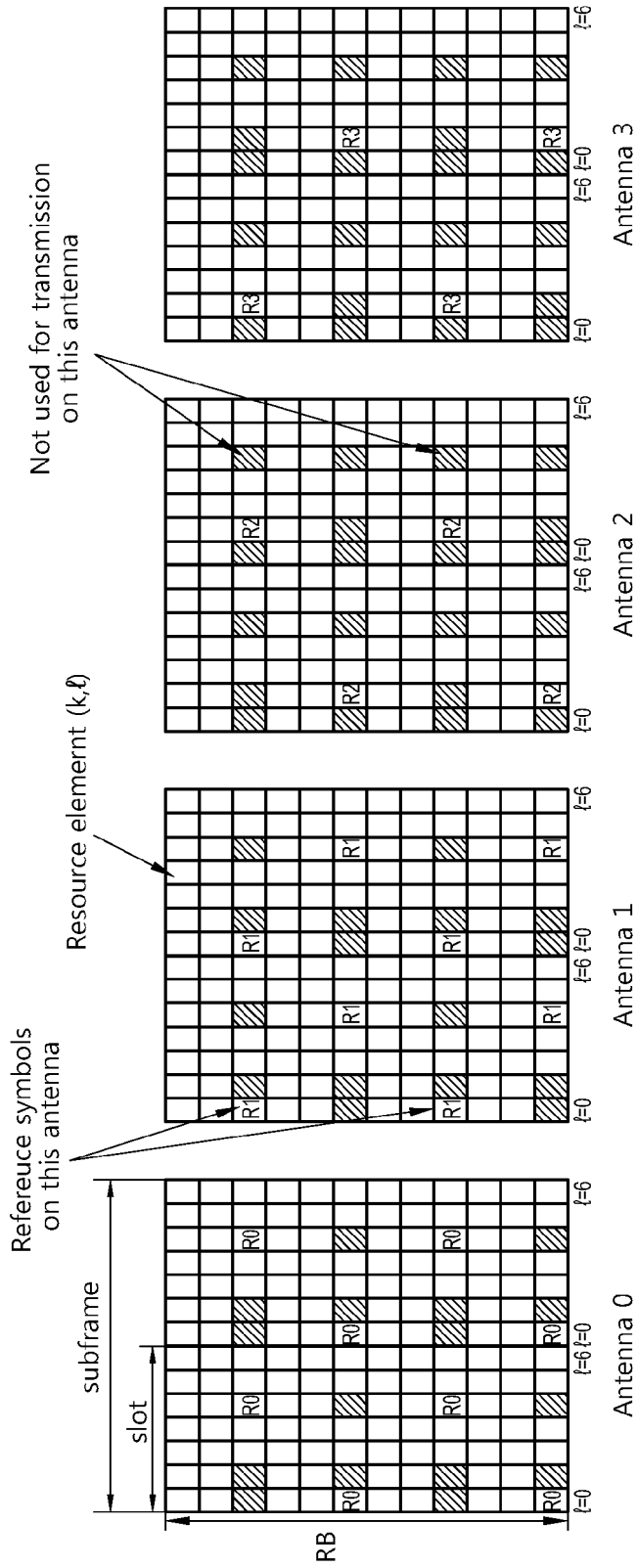
FIG. 7 shows an example of a common RS structure when a BS uses 4 antennas.

FIG. 5 shows an example of a common RS structure when a BS uses one antenna. FIG. 6 shows an example of a common RS structure when a BS uses 2 antennas. FIG. 7 shows an example of a common RS structure when a BS uses 4 antennas. Section 6.10.1 of the 3GPP TS 36.211 V8.2.0 (2008-03) may be incorporated herein by reference.

Referring to FIG. 5 to FIG. 7, in case of multiple-antenna transmission in which the BS uses a plurality of antennas, one resource grid exists for each antenna. 'R0' denotes an RS for a $1^{st}$ antenna. 'R1' denotes an RS for a $2^{nd}$ antenna. 'R2' denotes an RS for a $3^{rd}$ antenna. 'R3' denotes an RS for a $4^{th}$ antenna. Locations of the 'R0' to 'R3' do not overlap in a subframe. l denotes a location of an OFDM symbol in a slot. In a normal CP, l has a value in the range of 0 to 6. In one OFDM symbol, RSs for the respective antennas are positioned with a spacing of 6 subcarriers. In a subframe, the number of R0s is equal to the number of R1s, and the number of R2s is equal to the number of R3s. In the subframe, the number of R2s and R3s is less than the number of R0s and R1s. A resource element used for an RS of one antenna is not used for an RS of another antenna. This is to avoid interference between antennas.

The number of transmitted common RSs is equal to the number of antennas irrespective of the number of streams. The common RS has an independent RS for each antenna.

A frequency-domain position and a time-domain position of the common RS in the subframe are determined irrespective of a UE. A common RS sequence to be multiplied by the common RS is generated also irrespective of the UE. Therefore, all UEs within the cell can receive the common RS. However, a position of the common RS in the subframe and the common RS sequence may be determined according to a cell identifier (ID). Thus, the common RS is also referred to as a cell-specific RS.

The time-domain position of the common RS in the subframe may be determined according to an antenna number and the number of OFDM symbols in a resource block. The frequency-domain position of the common RS in the subframe may be determined according to an antenna number, a cell ID, an OFDM symbol index t, a slot number in a radio frame, etc.

The common RS sequence may be used in one subframe on an OFDM symbol basis. The common RS sequence may vary according to a cell ID, a slot number in one radio frame, an OFDM symbol index in a slot, a CP type, etc.

In one OFDM symbol, the number of RS subcarriers for each antenna is 2. When a subframe includes $N^{DL}$ resource blocks in the frequency domain, the number of RS subcarriers for each antenna is $2 \times N^{DL}$ in one OFDM symbol. Thus, a common RS sequence has a length of $2 \times N^{DL}$.

Equation 1 shows an example of a common RS sequence r(m).

$$r(m) = \frac{1}{\sqrt{2}}(1 - 2 \cdot c(2m)) + j\frac{1}{\sqrt{2}}(1 - 2 \cdot c(2m+1)) \quad \text{[Equation 1]}$$

Herein, m is $0, 1, \ldots, 2N^{max,DL}-1$. $N^{max,DL}$ denotes the number of resource blocks corresponding to a maximum bandwidth. For example, in the LTE system, $N^{max,DL}$ may be 110. c(i) denotes a PN sequence, and may be defined by a length-31 Gold sequence. Equation 2 shows an example of a Gold sequence c(i).

$c(n)=(x_1(n+N_c)+x_2(n+N_c))\mod 2$ $x_1(n+31)=(x_1(n+3)+x_1(n))\mod 2$ $x_2(n+31)=(x_2(n+3)+x_2(n+2)+x_1(n+1)+x_1(n))\mod 2$ [Equation 2]

Herein, $N_C$ is 1600, $x_1(i)$ denotes a $1^{st}$ m-sequence, and $x_2(i)$ denotes a $2^{nd}$ m-sequence. For example, the $1^{st}$ m-sequence or the $2^{nd}$ m-sequence can be initialized according to a cell ID for each OFDM symbol, a slot number in one radio frame, an OFDM symbol index in a slot, a CP type, etc.

In case of a system having a bandwidth smaller than $N^{max,DL}$, a certain part with a length of $2 \times N^{DL}$ can be selected for use from an RS generated in a length of $2 \times N^{max,DL}$.

Figure 8:
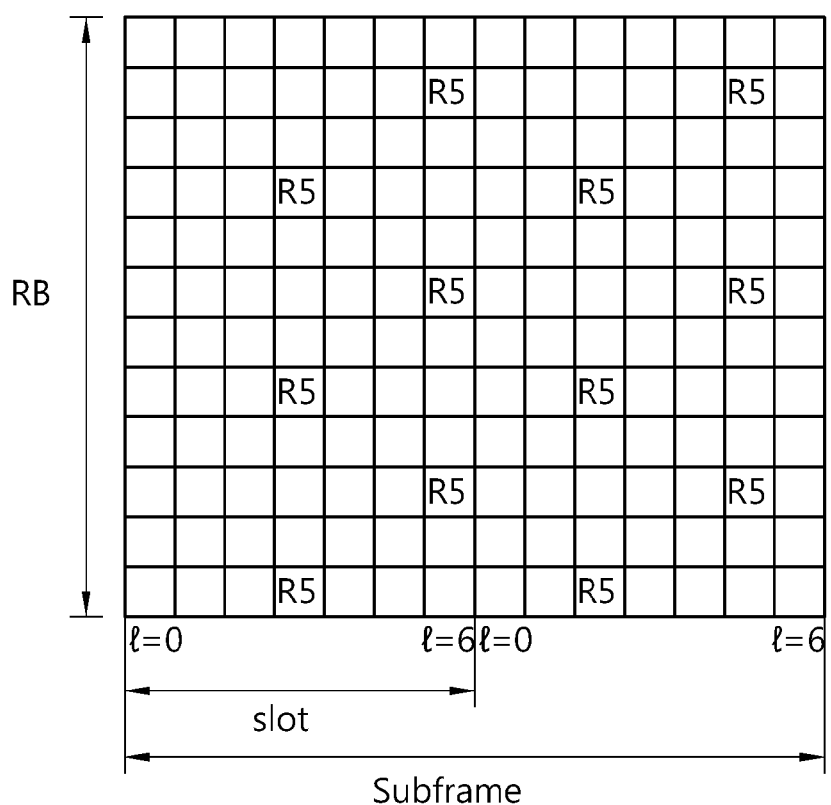
FIG. 8 shows an example of a dedicated RS structure in a normal CP.

FIG. 8 shows an example of a dedicated RS structure in a normal CP. In the normal CP, a subframe includes 14 OFDM symbols. 'R5' denotes an RS of an antenna for transmitting the dedicated RS. In one OFDM symbol including a reference symbol, a reference subcarrier is positioned with a spacing of 4 subcarriers.

Figure 9:
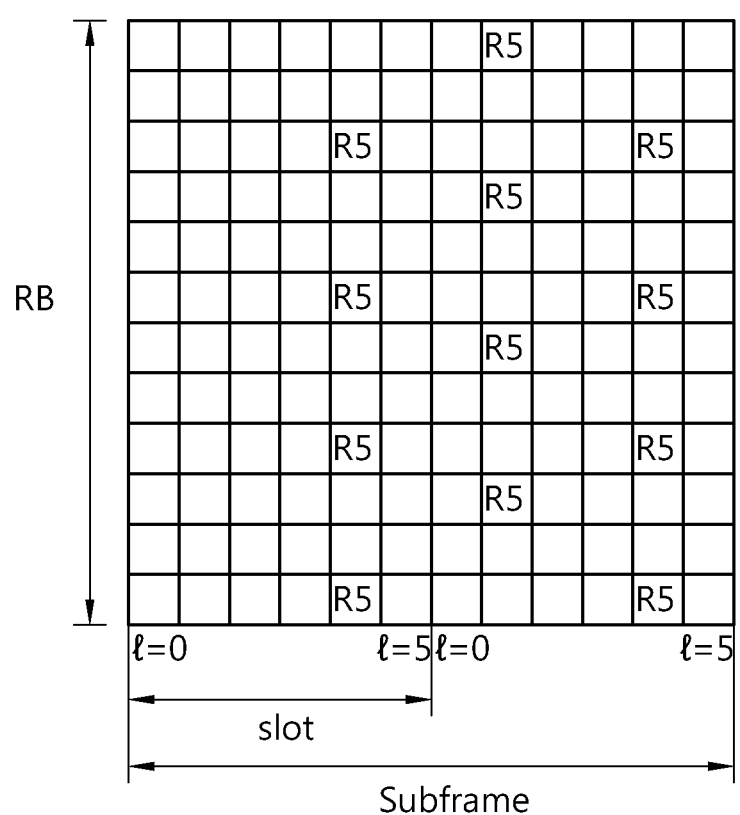
FIG. 9 shows an example of a dedicated RS structure in an extended CP.

FIG. 9 shows an example of a dedicated RS structure in an extended CP. In the extended CP, a subframe includes 12 OFDM symbols. In one OFDM symbol, RS subcarriers are positioned with a spacing of 3 subcarriers.

A frequency-domain position and a time-domain position of a dedicated RS in a subframe can be determined according to a resource block allocated for PDSCH transmission. A dedicated RS sequence can be determined according to a UE ID, and only the specific UE corresponding to the UE ID in a cell can receive the dedicated RS. Therefore, the dedicated RS is also referred to as a UE-specific RS.

Equations 1 and 2 above can also be applied in the dedicated RS sequence. However, in Equation 2, m is determined by $N^{PDSCH}$. $N^{PDSCH}$ denotes the number of resource blocks corresponding to a bandwidth in association with PDSCH transmission. Therefore, a length of the dedicated RS sequence may vary depending on $N^{PDSCH}$. That is, the RS sequence has a different length according to a data amount allocated to the UE. In Equation 2, the $1^{st}$ m-sequence $x_1(i)$ or the $2^{nd}$ m-sequence $x_2(i)$ may be initialized according to a cell ID for each subframe, a subframe position in one radio frame, a UE ID, etc.

The dedicated RS sequence is generated for each subframe, and may be applied on an OFDM symbol basis. If it is assumed that the number of RS subcarriers per resource block in one subframe is 12 and the number of resource blocks is $N^{PDSCH}$, then the total number of RS subcarrier is $12 \times N^{PDSCH}$. Therefore, the dedicated RS sequence has a length of $12 \times N^{PDSCH}$. When the dedicated RS sequence is generated using Equation 1, m is 0, 1, ..., $12N^{PDSCH}-1$. The dedicated RS sequences are sequentially mapped to reference symbols. First, the dedicated RS sequences are mapped to the reference symbols in one OFDM symbol in an ascending order of a subcarrier index, and are then mapped to a next OFDM symbol.

The common RS and the dedicated RS may be simultaneously used. For example, it is assumed that control information is transmitted on 3 OFDM symbols (l=0, 1, 2) of a $1^{st}$ slot in a subframe. OFDM symbols indexed with 0, 1, and 2 (l=0, 1, 2) may use the common RS. The remaining OFDM symbols other than the 3 OFDM symbols may use the dedicated RS.

Now, a UL RS in 3GPP LTE is described.

Figure 10:
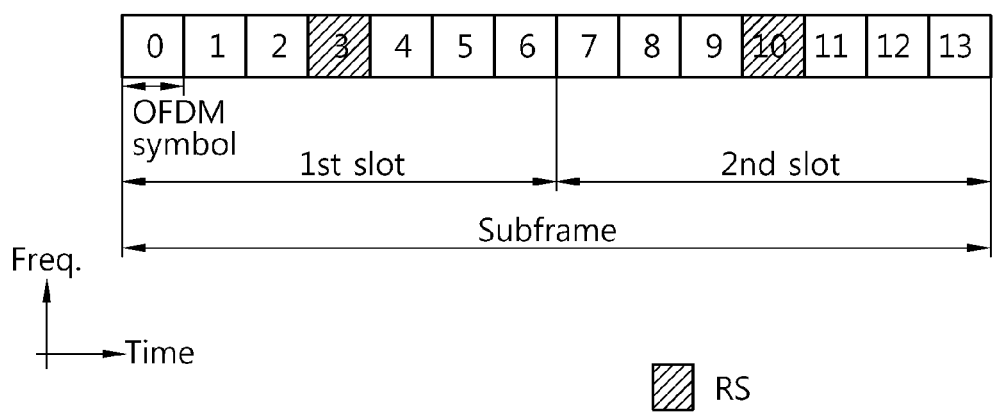
FIG. 10 shows an RS structure for a PDSCH in a normal CP.

FIG. 10 shows an RS structure for a PDSCH in a normal CP. A subframe includes a $1^{st}$ slot and a $2^{nd}$ slot. Each of the $1^{st}$ slot and the $2^{nd}$ slot includes 7 OFDM symbols. The 14 OFDM symbols in the subframe are numbered with symbol indices 0 to 13. An RS is transmitted by using the OFDM symbols having symbol indices 3 and 10. Data or control information can be transmitted by using the remaining OFDM symbols other than the OFDM symbols on which the RS is transmitted.

Figure 11:
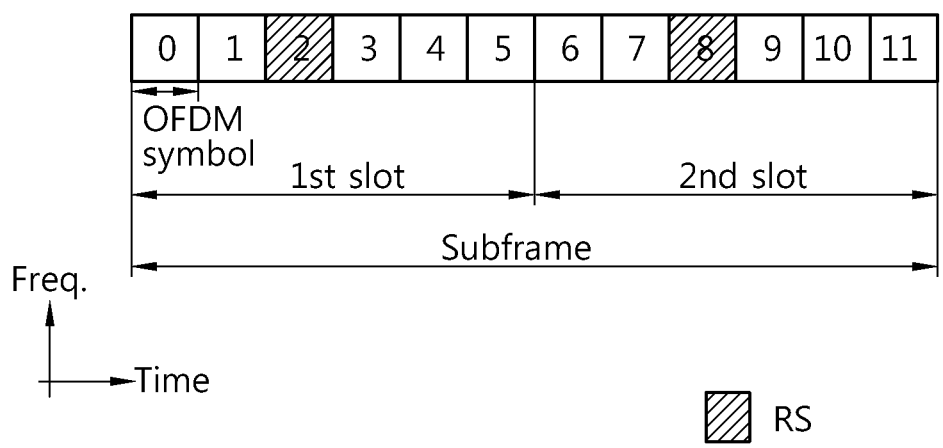
FIG. 11 shows an RS structure for a PDSCH in an extended CP.

FIG. 11 shows an RS structure for a PDSCH in an extended CP. A subframe includes a $1^{st}$ slot and a $2^{nd}$ slot. Each of the $1^{st}$ slot and the $2^{nd}$ slot includes 6 OFDM symbols. The 12 OFDM symbols in the subframe are numbered with symbol indices 0 to 11. An RS is transmitted by using the OFDM symbols having symbol indices 2 and 8. Data is transmitted by using the remaining OFDM symbols other than the OFDM symbols on which the RS is transmitted.

Although not shown in FIG. 10 and FIG. 11, a sounding reference signal (SRS) may be transmitted through at least one OFDM symbol in the subframe. For example, the SRS may be transmitted through a last OFDM symbol in the subframe. The SRS is an RS transmitted by a UE to a BS for UL scheduling. The BS estimates a UL channel through the received SRS, and uses the estimated UL channel for the UL scheduling. Hereinafter, unless otherwise specified, the RS denotes a demodulation RS for data demodulation. However, the technical features of the present invention are also easily applicable to the SRS.

In 3GPP LTE, a cyclically shifted sequence is used as a UL RS sequence. The cyclically shifted sequence is generated by cyclically shifting a base sequence by a specific cyclic shift (CS) amount.

The base sequence can be denoted by $r_{u,v}(n)$. Herein, i∈{0, 1, ..., 29} denotes a sequence group number, v denotes a base sequence number in a group, and n denotes a component index in the range of 0≤n≤M−1, where M is a base sequence length. The length M of the base sequence may be the same as the number of subcarriers included in one demodulation RS symbol in a subframe. For example, if one resource block includes 12 subcarriers and if 3 resource blocks are allocated for data transmission, the length M of the base sequence is 36.

Equation 3 shows an example of the base sequence $r_{u,v}(n)$.

$$r_{u,v}(n) = x_q(n \bmod N) \quad \text{[Equation 3]}$$

Herein, $x_q$ denotes a ZC sequence having a root index q, and N denotes a length of the sequence $x_q$. 'mod' denotes a modular operation. That is, the base sequence has a format in which the sequence $x_q$ is cyclically extended. When one resource block includes 12 subcarriers, the length M of the base sequence may be greater than or equal to 36.

The ZC sequence $x_q(m)$ having the root index q can be defined by Equation 4 below.

$$x_q(m) = \exp\left\{-\frac{j\pi qm(m+1)}{N}\right\}, \quad \text{[Equation 4]}$$
when N is odd number $$x_q(m) = \exp\left\{-\frac{j\pi qm^2}{N}\right\},$$
when N is even number Herein, N denotes a length of $x_q(m)$, where m satisfies 0≤m≤N−1. N may be a greatest prime number among natural numbers less than the length M of the base sequence. q is a natural number less than or equal to N, and q and N are relatively prime. If N is a prime number, the number of root indices q is N−1.

The root index q can be expressed by Equation 5 below.

$$q = \lfloor \bar{q} + \tfrac{1}{2} \rfloor + v \cdot (-1)^{\lfloor 2\bar{q} \rfloor}$$

$$\bar{q} = N \cdot (u+1)/31 \quad \text{[Equation 5]}$$

When one resource block includes 12 subcarriers, a computer generated CAZAC sequence may be used as the base sequence if the length M of the base sequence is 12 or 24. If the length M of the base sequence is 12 or 24, a base sequence number v in a group is 0 since each group includes only one base sequence.

If the length M of the base sequence is 12 or 24, an example of the base sequence $r_{u,v}(n)$ can be expressed by Equation 6 below.

$$r_{u,v}(n) = e^{jb(n)\pi/4} \quad \text{[Equation 6]}$$

The base sequence is defined differently according to a group number u.

If M=12, b(n) can be defined by Table 1 below.

TABLE 1

| u | b(0), . . . , b(11) | | | | | | | | | | | |
|---|---|---|---|---|---|---|---|---|---|---|---|---|
| 0  | -1 | 1  | 3  | -3 | 3  | 3  | 1  | 1  | 3  | 1  | -3 | 3  |
| 1  | 1  | 1  | 3  | 3  | 3  | -1 | 1  | -3 | -3 | 1  | -3 | 3  |
| 2  | 1  | 1  | -3 | -3 | -3 | -1 | -3 | -3 | 1  | -3 | 1  | -1 |
| 3  | -1 | 1  | 1  | 1  | 1  | -1 | -3 | -3 | 1  | -3 | 3  | -1 |
| 4  | -1 | 3  | 1  | -1 | 1  | -1 | -3 | -1 | 1  | -1 | 1  | 3  |
| 5  | 1  | -3 | 3  | -1 | -1 | 1  | 1  | -1 | -1 | 3  | -3 | 1  |
| 6  | -1 | 3  | -3 | -3 | -3 | 3  | 1  | -1 | 3  | 3  | -3 | 1  |
| 7  | -3 | -1 | -1 | -1 | 1  | -3 | 3  | -1 | 1  | -3 | 3  | 1  |
| 8  | 1  | -3 | 3  | 1  | -1 | -1 | -1 | 1  | 1  | 3  | -1 | 1  |
| 9  | 1  | -3 | -1 | 3  | 3  | -1 | -3 | 1  | 1  | 1  | 1  | 1  |
| 10 | -1 | 3  | -1 | 1  | 1  | -3 | -3 | -1 | -3 | -3 | 3  | -1 |
| 11 | 3  | 1  | -1 | -1 | 3  | 3  | -3 | 1  | 3  | 1  | 3  | 3  |
| 12 | 1  | -3 | 3  | 1  | 3  | 1  | 1  | 1  | -3 | -3 | -3 | 1  |
| 13 | 3  | 3  | -3 | 3  | -3 | 1  | 1  | 3  | -1 | -3 | 3  | 3  |
| 14 | -3 | 1  | -1 | -3 | -1 | 3  | 1  | 3  | 3  | 3  | -1 | 1  |
| 15 | 3  | -1 | 1  | -3 | -1 | -1 | 1  | 1  | 3  | 1  | -1 | -3 |
| 16 | 1  | 3  | 1  | -1 | 1  | 3  | 3  | 3  | -1 | -1 | 3  | -1 |
| 17 | -3 | 1  | 1  | 3  | -3 | 3  | -3 | -3 | 3  | 1  | 3  | -1 |
| 18 | -3 | 3  | 1  | 1  | -3 | 1  | -3 | -3 | -1 | -1 | 1  | -3 |
| 19 | -1 | 3  | 1  | 3  | 1  | -1 | -1 | 3  | -3 | -1 | -3 | -1 |
| 20 | -1 | -3 | 1  | 1  | 1  | 1  | 3  | 1  | -1 | 1  | -3 | -1 |
| 21 | -1 | 3  | -1 | 1  | -3 | -3 | -3 | -3 | -3 | 1  | -1 | -3 |
| 22 | 1  | 1  | -3 | -3 | -3 | -3 | -1 | 3  | -3 | 1  | -3 | 3  |
| 23 | 1  | 1  | -1 | -3 | -1 | -3 | 1  | -1 | 1  | 3  | -1 | 1  |
| 24 | 1  | 1  | 3  | 1  | 3  | 3  | -1 | 1  | -1 | -3 | -3 | 1  |
| 25 | 1  | -3 | 3  | 3  | 1  | 3  | 3  | 1  | -3 | -1 | -1 | 3  |
| 26 | 1  | 3  | -3 | -3 | 3  | -3 | 1  | -1 | -1 | 3  | -1 | -3 |
| 27 | -3 | -1 | -3 | -1 | -3 | 3  | 1  | -1 | 1  | 3  | -3 | -3 |
| 28 | -1 | 3  | -3 | 3  | -1 | 3  | 3  | -3 | 3  | 3  | -1 | -1 |
| 29 | 3  | -3 | -3 | -1 | -1 | -3 | -1 | 3  | -3 | 3  | 1  | -1 |

If M=24, b(n) can be defined by Table 2 below.

The base sequence $r_{u,v}(n)$ can vary depending on the sequence group unit u and the base sequence number v. The sequence group number u and the base sequence number v in the group may change semi-statically or may change in every slot. When the sequence group number u changes in every slot, it is called group hopping. When the base sequence number v in the group changes in every slot, it is called sequence hopping. Whether it is the group hopping or the sequence hopping can be determined by a higher layer of a physical layer. For example, the higher layer may be a radio resource control (RRC) that serves to control radio resources between a UE and a network.

The sequence group number u can be determined by Equation 7 below.

$$u = (f_{gh}(n_s) + f_{ss}) \bmod 30 \quad \text{[Equation 7]}$$

Herein, $f_{gh}(n_s)$ denotes a group hopping pattern, $n_s$ denotes a slot number in a radio frame, and $f_{ss}$ denotes a sequence shift pattern. In this case, 17 different hopping patterns and 30 different sequence shift patterns exist.

If the group hopping is not set, the group hopping pattern $f_{gh}(n_s)$ is 0. If the group hopping is set, the group hopping pattern $f_{gh}(n_s)$ can be expressed by Equation 8 below.

$$f_{gh} = \left( \sum_{i=0}^{7} c(8n_s + i) \cdot 2^i \right) \bmod 30 \quad \text{[Equation 8]}$$

TABLE 2

| u | b(0), . . . , b(23) | | | | | | | | | | | | | | | | | | | | | | | |
|---|---|---|---|---|---|---|---|---|---|---|---|---|---|---|---|---|---|---|---|---|---|---|---|---|
| 0  | -1 | 3  | 1  | -3 | 3  | -1 | 1  | 3  | -3 | 3  | 1  | 3  | -3 | 3  | 1  | 1  | -1 | 1  | 3  | -3 | 3  | -3 | -1 | -3 |
| 1  | -3 | 3  | -3 | -3 | -3 | 1  | -3 | -3 | 3  | -1 | 1  | 1  | 1  | 3  | 1  | -1 | 3  | -3 | -3 | 1  | 3  | 1  | 1  | -3 |
| 2  | 3  | -1 | 3  | 3  | 1  | 1  | -3 | 3  | 3  | 3  | 3  | 1  | -1 | 3  | -1 | 1  | 1  | -1 | -3 | -1 | -1 | 1  | 3  | 3  |
| 3  | -1 | -3 | 1  | 1  | 3  | -3 | 1  | 1  | -3 | -1 | -1 | 1  | 3  | 1  | 3  | 1  | -1 | 3  | 1  | 1  | -3 | -1 | -3 | -1 |
| 4  | -1 | -1 | -1 | -3 | -3 | -1 | 1  | 1  | 3  | 3  | -1 | 3  | -1 | 1  | -1 | -3 | 1  | -1 | -3 | -3 | 1  | -3 | -1 | -1 |
| 5  | -3 | 1  | 1  | 3  | -1 | 1  | 3  | 1  | -3 | 1  | -3 | 1  | 1  | -1 | -1 | 3  | -1 | -3 | 3  | -3 | -3 | -3 | 1  | 1  |
| 6  | 1  | 1  | -1 | -1 | 3  | -3 | -3 | 3  | -3 | 1  | -1 | -1 | 1  | -1 | 1  | 1  | -1 | -3 | -1 | 1  | -1 | 3  | -1 | -3 |
| 7  | -3 | 3  | 3  | -1 | -1 | -3 | -1 | 3  | 1  | 3  | 1  | 3  | 1  | 1  | -1 | 3  | 1  | -1 | 1  | 3  | -3 | -1 | -1 | 1  |
| 8  | -3 | 1  | 3  | -3 | 1  | -1 | -3 | 3  | -3 | 3  | -1 | -1 | -1 | -1 | 1  | -3 | -3 | -3 | 1  | -3 | -3 | -3 | 1  | -3 |
| 9  | 1  | 1  | -3 | 3  | 3  | -1 | -3 | -1 | 3  | -3 | 3  | 3  | 3  | -1 | 1  | 1  | -3 | 1  | -1 | 1  | 1  | -3 | 1  | 1  |
| 10 | -1 | 1  | -3 | -3 | 3  | -1 | 3  | -1 | -1 | -3 | -3 | -3 | -1 | -3 | -3 | 1  | -1 | 1  | 3  | 3  | -1 | 1  | -1 | 3  |
| 11 | 1  | 3  | 3  | -3 | -3 | 1  | 3  | 1  | -1 | -3 | -3 | -3 | 3  | 3  | -3 | 3  | 3  | -1 | -3 | 3  | -1 | 1  | -3 | 1  |
| 12 | 1  | 3  | 3  | 1  | 1  | 1  | -1 | -1 | 1  | -3 | 3  | -1 | 1  | 1  | -3 | 3  | 3  | -1 | -3 | 3  | -3 | -1 | -3 | -1 |
| 13 | 3  | -1 | -1 | -1 | -1 | -3 | -1 | 3  | 3  | 1  | -1 | 1  | 3  | 3  | -1 | 1  | 1  | -3 | 1  | 3  | -1 | -3 | 3  | 3  |
| 14 | -3 | -3 | 3  | 1  | 3  | 1  | -3 | 3  | 1  | 3  | 1  | 1  | 3  | 3  | -1 | -1 | -3 | 1  | -3 | -1 | 3  | 1  | 1  | 3  |
| 15 | -1 | -1 | 1  | -3 | 1  | 3  | -3 | 1  | -1 | -3 | -1 | 3  | 1  | 3  | 1  | -1 | -3 | -3 | -1 | -1 | -3 | -3 | -3 | -1 |
| 16 | -1 | -3 | 3  | -1 | -1 | -1 | -1 | 1  | 1  | -3 | 3  | 1  | 3  | 3  | 1  | -1 | 1  | -3 | 1  | -3 | 1  | 1  | -3 | -1 |
| 17 | 1  | 3  | -1 | 3  | 3  | -1 | -3 | 1  | -1 | -3 | 3  | 3  | 3  | -1 | 1  | 1  | 3  | -1 | -3 | -1 | 3  | -1 | -1 | -1 |
| 18 | 1  | 1  | 1  | 1  | 1  | -1 | 3  | -1 | -3 | 1  | 1  | 3  | -3 | 1  | -3 | -1 | 1  | 1  | -3 | -3 | 3  | 1  | 1  | -3 |
| 19 | 1  | 3  | 3  | 1  | -1 | -3 | 3  | -1 | 3  | 3  | 3  | -3 | 1  | -1 | 1  | -1 | -3 | -1 | 1  | 3  | -1 | 3  | -3 | -3 |
| 20 | -1 | -3 | 3  | -3 | -3 | -3 | -1 | -1 | -3 | -1 | -3 | 3  | 1  | 3  | -3 | -1 | 3  | -1 | 1  | -1 | 3  | -3 | 1  | -1 |
| 21 | -3 | -3 | 1  | 1  | -1 | 1  | -1 | 1  | -1 | 3  | 1  | -3 | -1 | 1  | -1 | 1  | -1 | -1 | 3  | 3  | -3 | -1 | 1  | -3 |
| 22 | -3 | -1 | -3 | 3  | 1  | -1 | -3 | -1 | -3 | -3 | 3  | -3 | 3  | -3 | -1 | 1  | 3  | 1  | -3 | 1  | 3  | 3  | -1 | -3 |
| 23 | -1 | -1 | -1 | -1 | 3  | 3  | 3  | 1  | 3  | 3  | -3 | 1  | 3  | -1 | 3  | -1 | 3  | 3  | -3 | 3  | 1  | -1 | 3  | 3  |
| 24 | 1  | -1 | 3  | 3  | -1 | -3 | 3  | -3 | -1 | -1 | 3  | -1 | 3  | -1 | -1 | 1  | 1  | 1  | 1  | -1 | -1 | -3 | -1 | 3  |
| 25 | 1  | -1 | 1  | -1 | 3  | -1 | 3  | 1  | 1  | -1 | -1 | -3 | 1  | 1  | -3 | 1  | 3  | -3 | 1  | 1  | -3 | -3 | -1 | -1 |
| 26 | -3 | -1 | 1  | 3  | 1  | 1  | -3 | -1 | -1 | -3 | 3  | -3 | 3  | 1  | -3 | 3  | -3 | 1  | -1 | 1  | -3 | 1  | 1  | 1  |
| 27 | -1 | -3 | 3  | 3  | 1  | 1  | 3  | -1 | -3 | -1 | -1 | -1 | 3  | 1  | -3 | -3 | -1 | 3  | -3 | -1 | -3 | -1 | -3 | -1 |
| 28 | -1 | -3 | -1 | -1 | 1  | -3 | -1 | -1 | 1  | -1 | -3 | 1  | 1  | -3 | 1  | -3 | -3 | 3  | 1  | 1  | -1 | 3  | -1 | -1 |
| 29 | 1  | 1  | -1 | -1 | -3 | -1 | 3  | -1 | 3  | -1 | 1  | 3  | 1  | -1 | 3  | 1  | 3  | -3 | -3 | 1  | -1 | -1 | 1  | 3  |

Herein, c(n) denotes a PN sequence. c(n) can be defined by a length-31 Gold sequence. Equation 9 below shows an example of the sequence c(n).

$$c(n)=(x_1(n+N_c)+x_2(n+N_c)) \bmod 2$$

$$x_1(n+31)=(x_1(n+3)+x_1(n)) \bmod 2$$

$$x_2(n+31)=(x_2(n+3)+x_2(n+2)+x_1(n+1)+x_1(n)) \bmod 2 \quad \text{[Equation 9]}$$

Herein, $N_C=1600$. $x_1(i)$ denotes a $1^{st}$ m-sequence. $x_2(i)$ denotes a $2^{nd}$ m-sequence. For example, the $1^{st}$ m-sequence can be initialized to $x_1(0)=1$, $x_1(n)=0(n=1, 2, \ldots, 30)$ in every radio frame. In addition, the $2^{nd}$ m-sequence can be initialized in every radio frame according to a cell identity (ID). Equation 10 below shows an example the initialization of the $2^{nd}$ m-sequence.

$$c_{init} = \sum_{i=0}^{30} x_2(i) \cdot 2^i = \lfloor N_{cell\_ID}/30 \rfloor \quad \text{[Equation 10]}$$

Herein, $N_{cell\_ID}$ denotes a cell ID.

The sequence shift pattern $f_{ss}$ can be expressed by Equation 11 below.

$$f_{ss}=((N_{cell\_ID} \bmod 30)+d) \bmod 30 \quad \text{[Equation 11]}$$

Herein, $d \in \{0, 1, \ldots, 29\}$ is a group allocation parameter. The group allocation parameter d can be determined by a higher layer. The group allocation parameter may be a common parameter which is commonly used by all UEs in a cell.

Next, the base sequence number v in the group is described. When one resource block includes 12 subcarriers, if the length M of the base sequence is less than 72, each group includes only one base sequence (v=0). In this case, sequence hopping is not applied.

When one resource block includes 12 subcarriers, if the length M of the base sequence is greater than or equal to 72, each group includes 2 base sequences (v=0, 1). In this case, if the sequence hopping is set instead of the group hopping, the sequence hopping may be performed in such a manner that the base sequence number v in the group changes in every slot. If the sequence hopping is not performed, the base sequence number v in the group can be fixed to 0.

When the sequence hopping is performed, the base sequence number v in the group can be expressed by Equation 12 below.

$$v=c(n_s) \quad \text{[Equation 12]}$$

Herein, c(n) denotes a PN sequence and may be the same as that described in Equation 9 above. For example, the $1^{st}$ m-sequence can be initialized to $x_1(0)=1$, $x_1(n)=0(n=1, 2, \ldots, 30)$ in every radio frame. In addition, the $2^{nd}$ m-sequence can be initialized in every radio frame according to a cell ID and a sequence shift pattern $f_{ss}$. Equation 13 below shows an example the initialization of the $2^{nd}$ m-sequence.

$$c_{init} = \sum_{i=0}^{30} x_2(i) \cdot 2^i = \lfloor N_{cell\_ID}/30 \rfloor \cdot 2^5 + f_{ss} \quad \text{[Equation 13]}$$

The base sequence $r_{u,v}(n)$ can be cyclically shifted according to Equation 14 below to generate a cyclically shifted sequence $r_{u,v}(n, I_{cs})$.

$$r_{u,v}(n, I_{cs}) = r_{u,v}(n) \cdot \exp\left(\frac{j2\pi I_{cs} n}{12}\right) \quad \text{[Equation 14]}$$

Herein, $2\pi I_{cs}/12$ denotes a cyclic shift (CS) amount, and Ics denotes a CS index indicating the CS amount ($0 \leq I_{cs} < 12$, where Ics is integer).

The CS index Ics can be determined according to a cell-specific CS parameter, a UE-specific CS parameter, and a hopping CS parameter. The cell-specific CS parameter has a different value for each cell, but is common to all UEs in a cell. The UE-specific CS parameter may have a different value for each UE in the cell. The hopping CS parameter may have a different value for each slot. Therefore, the CS index may vary for each slot. When the CS index varies for each slot and thus the CS amount varies, this is called slot-level hopping of the CS amount.

The CS index Ics can be expressed by Equation 15 below.

$$I_{cs}=(I_a+I_b+I(n_s)) \bmod 12 \quad \text{[Equation 15]}$$

Herein, Ia is determined by the cell-specific CS parameter, Ib denotes the UE-specific CS parameter, and $I(n_s)$ denotes the hopping CS parameter.

The cell-specific parameter can be determined by a higher layer such as RRC. Table 3 below shows an example of the parameter Ia determined by the cell-specific CS parameter.

TABLE 3

| Cell-specific CS parameter | Ia |
|---|---|
| 0 | 0 |
| 1 | 2 |
| 2 | 3 |
| 3 | 4 |
| 4 | 6 |
| 5 | 8 |
| 6 | 9 |
| 7 | 10 |

The UE-specific CS parameter Ib can be indicted by a CS field of a UL grant. In a case where radio resource scheduling for data transmission is persistent scheduling or semi-persistent scheduling, if there is no UL grant corresponding to data transmission, the UE-specific CS parameter Ib may be set to zero.

Table 4 below shows an example of the UE-specific CS parameter determined by the CS field.

TABLE 4

| UE-specific CS parameter | Ib |
|---|---|
| 000 | 0 |
| 001 | 6 |
| 010 | 3 |
| 011 | 4 |
| 100 | 2 |
| 101 | 8 |
| 110 | 10 |
| 111 | 9 |

The hopping CS parameter $I(n_s)$ can be expressed by Equation 16 below.

$$I(n_s) = \sum_{i=0}^{7} c(8N_{symb} \cdot n_s + i) \cdot 2^i \quad \text{[Equation 16]}$$

Herein, c(n) denotes a PN sequence, and $N_{symb}$ denotes the number of OFDM symbols included in a slot. The PN sequence c(n) may be the same as that of Equation 9 above. For example, the $1^{st}$ m-sequence can be initialized to $x_1(0)=1$, $x_1(n)=0(n=1, 2, \ldots, 30)$ in every radio frame. In addition, the $2^{nd}$ m-sequence can be initialized in every radio frame according to a cell ID and a sequence shift pattern $f_{ss}$. The initialization of the $2^{nd}$ m-sequence may be the same as the described in Equation 13 above.

Now, a synchronization signal in 3GPP LTE is described. The synchronization signal is used when a UE achieves DL synchronization and acquires a cell ID. The synchronization signal includes a primary synchronization signal (PSS) and a secondary synchronization signal (SSS). The PSS is located in a last OFDM symbol of a $1^{st}$ slot and a $11^{th}$ slot in a radio frame. Two PSSs use the same primary synchronization code (PSC). When using three PSCs, a BS selects one of the three PSCs, and transmits the selected PSC by carrying it on the last OFDM symbol of the $1^{st}$ slot and the $11^{t1}$ slot. The SSS is located in an OFDM symbol located right before the last OFDM symbol of the $1^{st}$ slot and the $11^{th}$ slot. The SSS and the PSS may be located in contiguous OFDM symbols. One SSS uses two secondary synchronization codes (SSCs). When the SSC uses an m-sequence and one SSS includes 64 subcarriers, two m-sequences having a length of 31 are mapped to one SSS.

Now, a structure of a transmitter for generating and processing signals to implement an embodiment of the present invention will be described.

A subblock is a resource unit for mapping time-domain symbols and/or frequency-domain symbols to radio resources. For example, the subblock may include 12 subcarriers. Respective subblocks may be contiguous to each other or may not contiguous to each other. An amount (or size) of resource included in each subblock may be equal or different. For example, a subblock #1 may include 12 subcarriers, and a subblock #2 may include 24 subcarriers. The subblock may also be referred to as other terms such as a cluster, a resource block, a subchannel, etc. Alternatively, one or more subblocks may correspond to one carrier. The carrier is defined with a center frequency and a bandwidth.

A subcarrier mapper 212 maps N subblocks to frequency-domain subcarriers on a subblock basis. The subcarrier mapper 212 can perform localized mapping or distributed mapping on a subblock basis. An IFFT unit 213 outputs time-domain signals by performing IFFT on the subblocks mapped in the frequency domain. A cyclic prefix (CP) inserter 214 inserts a CP to the time-domain signal.

Figure 12:
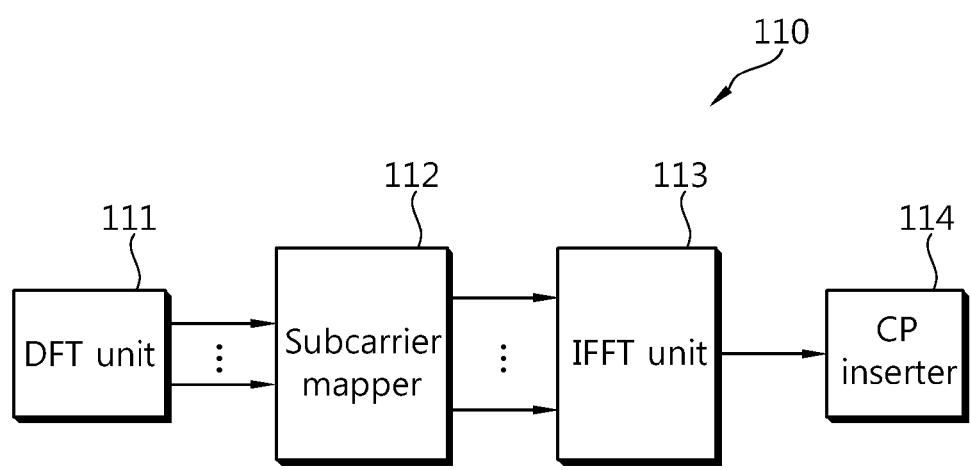
FIG. 12 is a block diagram showing a transmitter for performing data processing based on SC-FDMA.

FIG. 12 is a block diagram showing a transmitter for performing data processing based on SC-FDMA. The SC-FDMA is a transmission scheme in which IFFT is performed after DFT spreading. The SC-FDMA is also called DFT-spread OFDM (DFT-s OFDM). A transmitter 110 includes a discrete Fourier transform (DFT) unit 111, a subcarrier mapper 112, an inverse fast Fourier transform (IFFT) unit 113, and a CP inserter 114. The DFT unit 111 outputs DFT symbols by performing DFT on complex-valued symbols. The subcarrier mapper 112 maps the DFT symbols to respective subcarriers in a frequency domain. The IFFT unit 113 outputs time-domain signals by performing IFFT on the symbols mapped in the frequency domain. The CP inserter 114 inserts a CP to the time-domain signals. The time-domain signal to which the CP is inserted is an OFDM symbol.

Figure 13:
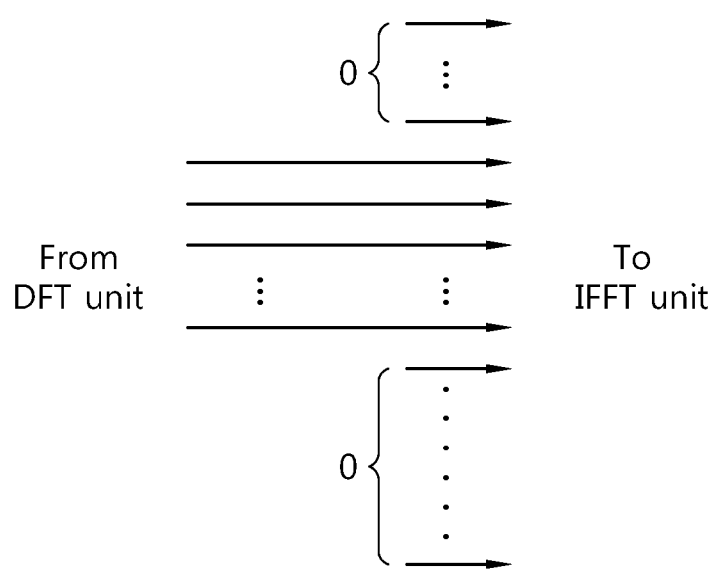
FIG. 13 shows an example of subcarrier mapping.

FIG. 13 shows an example of subcarrier mapping. DFT symbols output from a DFT unit are mapped to contiguous subcarriers in a frequency domain. This is called localized mapping. The localized mapping is used in a PUSCH of 3GPP LTE.

Figure 14:
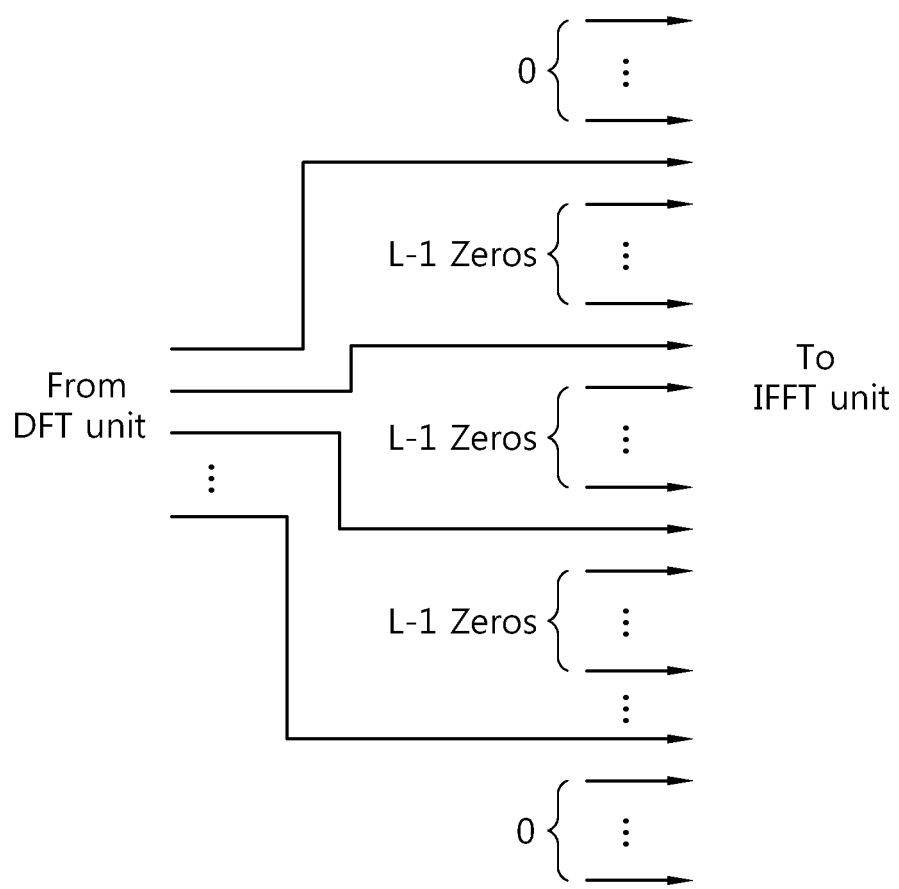
FIG. 14 shows another example of subcarrier mapping.

FIG. 14 shows another example of subcarrier mapping. DFT symbols output from a DFT unit are mapped to non-contiguous subcarriers. The DFT symbols may be mapped to subcarriers equidistantly distributed in a frequency domain. This is called distributed mapping.

Figure 15:
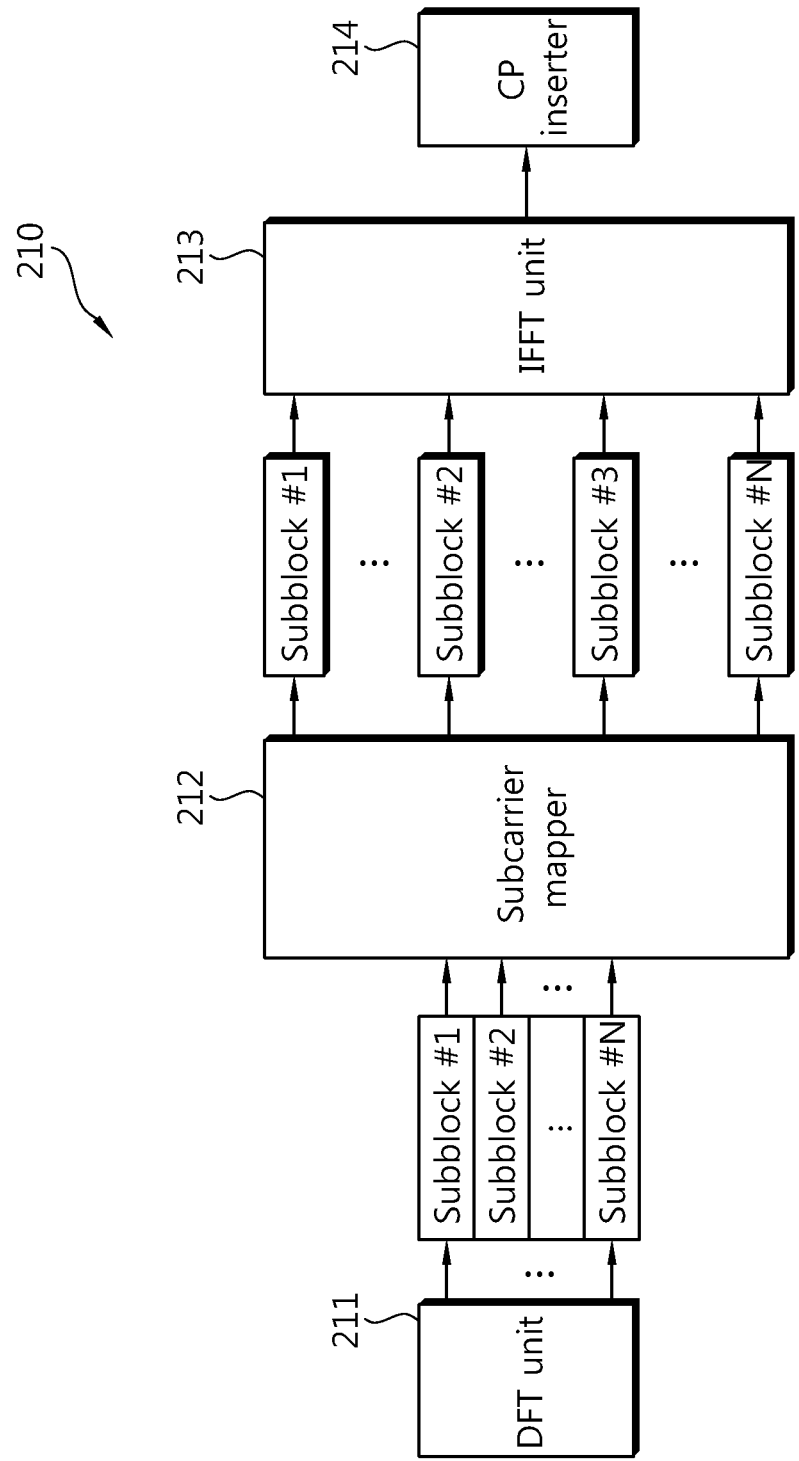
FIG. 15 is a block diagram showing a clustered SC-FDMA transmitter.

FIG. 15 is a block diagram showing a clustered SC-FDMA transmitter. A method of processing symbols subjected to DFT by dividing them on a subblock basis is called clustered SC-FDMA or clustered DFT-s OFDM. A transmitter 210 includes a DFT unit 211, a subcarrier mapper 212, an IFFT unit 213, and a CP inserter 214.

DFT symbols output from the DFT unit 211 are divided into N subblocks (where N is a natural number). Herein, the N subblocks can be expressed by a subblock #1, a subblock #2, . . . , a subblock #N. The subcarrier mapper 212 maps the N subblocks to frequency-domain subcarriers on a subblock basis. The subcarrier mapper 212 can perform localized mapping or distributed mapping on a subblock basis. The IFFT unit 213 outputs time-domain signals by performing IFFT on the subblocks mapped in the frequency domain. The CP inserter 214 inserts a CP to the time-domain signals.

The transmitter 210 can support single-carrier transmission or multi-carrier transmission. When supporting only the single-carrier transmission, all of the N subblocks correspond to one carrier. When supporting the multi-carrier transmission, at least one subblock among the N subblocks can correspond to each carrier.

Figure 16:
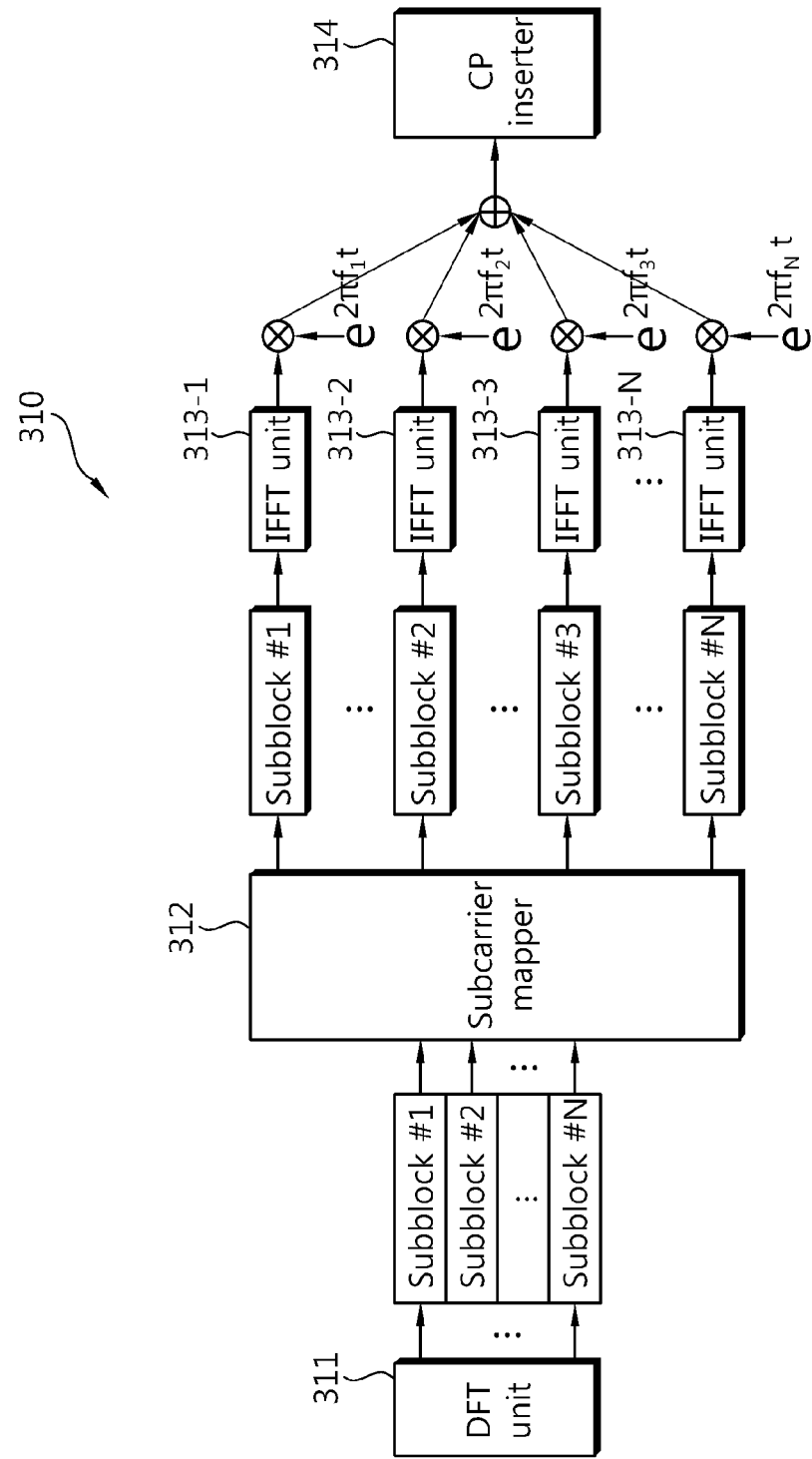
FIG. 16 is a block diagram showing another example of a transmitter supporting multi-carrier transmission.

FIG. 16 is a block diagram showing another example of a transmitter supporting multi-carrier transmission. A transmitter 310 includes a DFT unit 311, a subcarrier mapper 312, a plurality of IFFT units 313-1, 313-2, . . . , 313-N, and a CP inserter 214 (where N is a natural number). DFT symbols output from the DFT unit 311 are divided into N subblocks. The subcarrier mapper 312 maps the N subblocks to subcarriers in a frequency domain on a subblock basis. The subcarrier mapper 312 performs localized mapping or distributed mapping on a subblock basis. IFFT is performed independently on each subblock mapped in the frequency domain. The CP inserter 214 inserts a CP to a time-domain signal. The $n^{th}$ IFFT unit 313-$n$ outputs an $n^{th}$ time-domain signal by performing IFFT on a subblock #n (where n=1, 2, . . . , N). The $n^{th}$ time-domain signal is multiplied by an $n^{th}$ carrier ($f_n$) signal to generate an $n^{th}$ radio signal. N radio signals generated from the N subblocks are added up, and then a CP is inserted thereto by the CP inserter 214.

The subblocks can respectively correspond to the carriers. The respective subblocks can correspond to contiguous carriers or can correspond to non-contiguous carriers.

Figure 17:
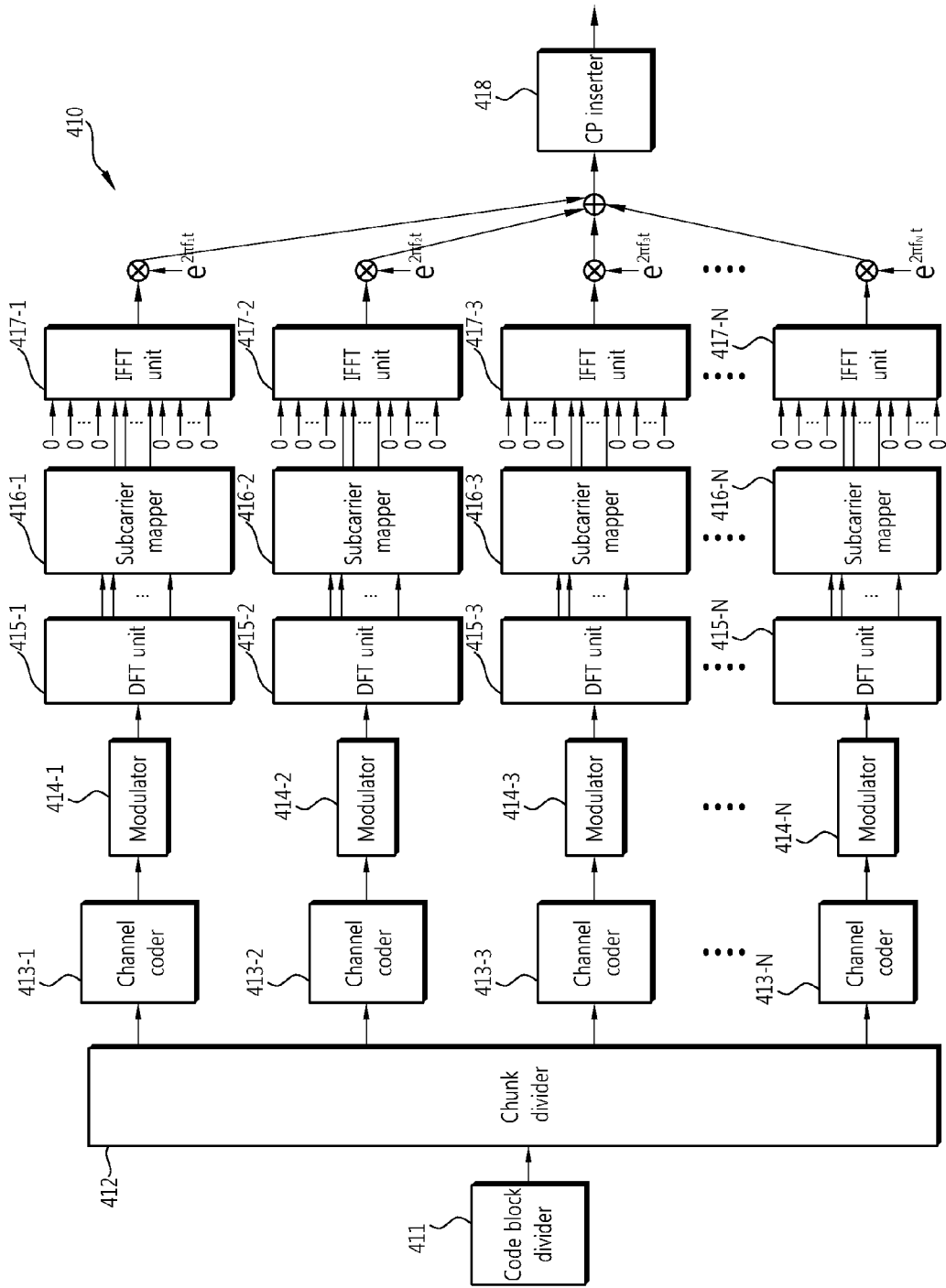
FIG. 17 is a block diagram showing another example of a transmitter supporting multi-carrier transmission.

FIG. 17 is a block diagram showing another example of a transmitter supporting multi-carrier transmission. A transmitter 410 includes a code block divider 411, a chunk divider 412, a plurality of channel coders 413-1, . . . , 413-N, a plurality of modulators 414-1, . . . , 414-N, a plurality of DFT units 415-1, . . . , 415-N, a plurality of subcarrier mappers 416-1, . . . , 416-N, a plurality of IFFT units 417-1, . . . , 417-N, and a CP inserter 418 (where N is a natural number). Herein, N may be the number of multiple carriers used by the multi-carrier transmitter.

The code block divider 411 divides a transport block into a plurality of code blocks. The chunk divider 412 divides the code block into a plurality of chunks. Herein, the code block can be regarded as data transmitted from the multi-carrier transmitter, and the chunk can be regarded as a data segment transmitted through one carrier among multiple carriers.

DFT is performed on a chunk basis. When the DFT is performed on a chunk basis in a transmission method, this is called chunk specific DFT-s OFDM or Nx SC-FDMA. This can be used for contiguous carrier allocation or non-contiguous carrier allocation. The divided chunks are sequentially subjected to the plurality of channel coders 413-1, ..., 413-N and the plurality of modulators 414-1, ..., 414-N to generate complex-valued symbols. The complex-valued symbols, which are respectively subjected to the plurality of DFT units 415-1, ..., 415-N, the plurality of subcarrier mappers 416-1, ..., 416-N, and the plurality of IFFT units 417-1, ..., 417-N, are added up, and then a CP is added thereto by the CP inserter 418.

An OFDM symbol may be a time-domain symbol to which any multiple access scheme is applied such as OFDMA, DFT-s OFDM, clustered DFT-s OFDM, and/or chunk-specific DFT-s OFDM. However, the OFDM symbol is not limited to a specific multiple access scheme.

In the multiple access scheme using DFT and IFFT such as DFT-s OFDM, clustered DFT-s OFDM, and/or chunk-specific DFT-s OFDM, a sequence may be generated before DFT processing, and then may be subjected to DFT processing and IFFT processing sequentially. Alternatively, the sequence may be generated after the DFT processing, that is, may be generated in a frequency domain, and then may be subjected to only the IFFT processing. Hereinafter, unless otherwise specified, it is described that the sequence is generated in the frequency domain. However, those ordinary skilled in the art can easily apply the present invention to the sequence generated before the DFT processing.

For clarity of explanation, the technical features of the present invention are applied to an RS in the following descriptions. However, those ordinary skilled in the art can easily apply the technical features of the present invention to other signals, such as a synchronization signal, a preamble, a PCFICH, a PDSCH, a PUCCH, a PUSCH, etc.

I. Subblock-Based Signal Transmission

Hereinafter, a method of generating and transmitting an RS sequence on a subblock basis is described. The subblock is a resource unit for mapping a sequence to a radio resource, and may include 12 subcarriers for example. Each subblock may include identical or different resources. By allowing a sequence to have a low PAPR/CM characteristic, this method can be more effectively used for a UL RS. In the following description, an RS sequence is generated on a subblock basis and is applied to a UL RS of 3GPP LTE.

Figure 18:
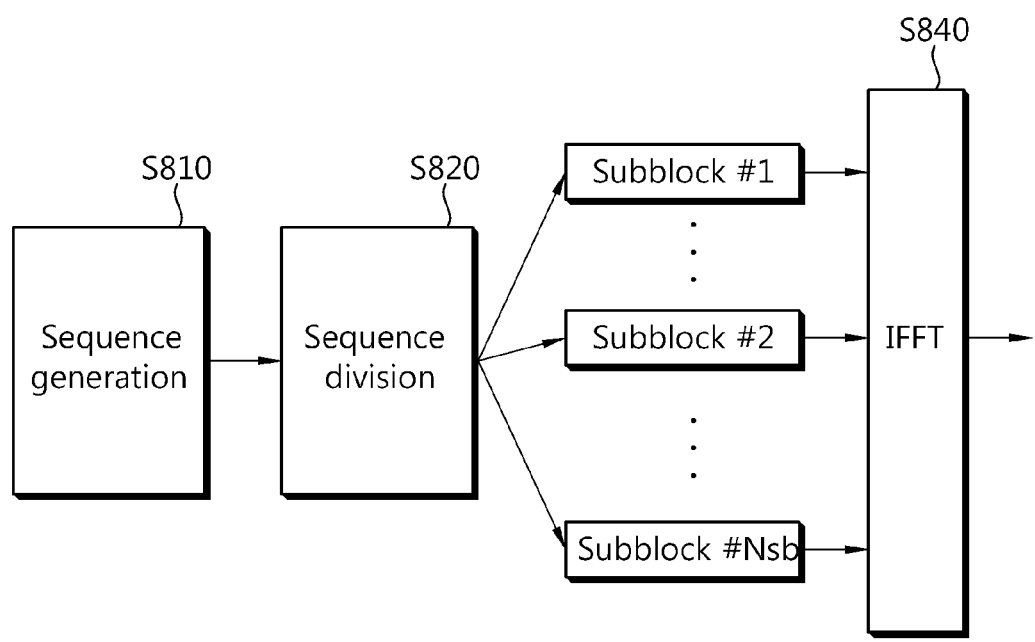
FIG. 18 shows RS transmission according to an embodiment of the present invention.

FIG. 18 shows RS transmission according to an embodiment of the present invention. An RS sequence is generated (step S810). The RS sequence is divided on a subblock basis (step S820). The divided RS sequence segments are mapped to respective subblocks. $N_{sb}$ denotes the number of subblocks. IFFT is performed on the mapped RS sequence segments (step S840). An RS sequence having a long length corresponding to a full subblock length is generated, and the generated RS sequence is transmitted by being divided on a subblock basis.

For example, it is assumed that a subblock size is 12 (i.e., a subblock includes 12 subcarriers), and N=4. When each subblock spacing is 12 subcarriers, the total number of subcarrier is 96. It can be said that a system bandwidth is configured sequentially such as [subblock #1, 12 null subcarrier, subblock #2, 12 null subcarrier, subblock #3, 12 null subcarrier, subblock #4, 12 null subcarrier]. Assume that an RS sequence having a length of 12 is mapped to each subblock according to the conventional technique. That is, the same RS sequence is mapped to all of the subblocks #1 to #4. In this case, CM is 7.0808 dB.

When a sequence group number u is 3 and a base sequence number v in a group is 0, a base sequence $r_{u,v}$ having a length of 48 can be obtained by Equation 17 below.

$$r_{u,v} = [1, 0.69519 - 0.71882i, -0.74165 - 0.67078i, \quad \text{[Equation 17]}$$
$$0.1001 + 0.99498i, -0.16633 - 0.98607i,$$
$$0.8604 + 0.50962i, 0.42093 + 0.90709i,$$
$$-0.89252 + 0.45101i, -0.82444 + 0.56595i,$$
$$-0.033415 + 0.99944i, 0.99108 - 0.13329i,$$
$$-0.89252 - 0.45101i, 0.96447 + 0.2642i,$$
$$-0.74165 + 0.67078i, -0.82444 - 0.56595i,$$
$$-0.42093 - 0.90709i, -0.64563 - 0.76365i,$$
$$-0.97996 + 0.19919i, 0.48058 + 0.87695i,$$
$$-0.033415 - 0.99944i, 0.35941 + 0.93318i,$$
$$-0.99777 - 0.066793i, -0.29628 - 0.9551i,$$
$$0.1001 - 0.99498i, -0.29628 - 0.9551i,$$
$$-0.99777 - 0.066793i, 0.35941 + 0.93318i,$$
$$-0.033415 - 0.99944i, 0.48058 + 0.87695i,$$
$$-0.97996 + 0.19919i, -0.64563 - 0.76365i,$$
$$-0.42093 - 0.90709i, -0.82444 - 0.56595i,$$
$$-0.74165 + 0.67078i, 0.96447 + 0.2642i,$$
$$-0.89252 - 0.45101i, 0.99108 - 0.13329i,$$
$$-0.033415 + 0.99944i, -0.82444 + 0.56595i,$$
$$-0.89252 + 0.45101i, -0.42093 + 0.90709i,$$
$$0.8604 + 0.50962i, -0.16633 - 0.98607i,$$
$$0.1001 + 0.99498i, -0.74165 - 0.67078i,$$
$$0.69519 - 0.71882i, 1 + 1.9589e - 014i, 1]$$

The base sequence is divided into subsequences having a length of 12 in order to fit 4 subblocks. The subsequences are respectively mapped to the subblocks. In this case, CM is 1.8294 dB, and thus a CM gain is about 387% with respect to the conventional technique.

Figure 19:
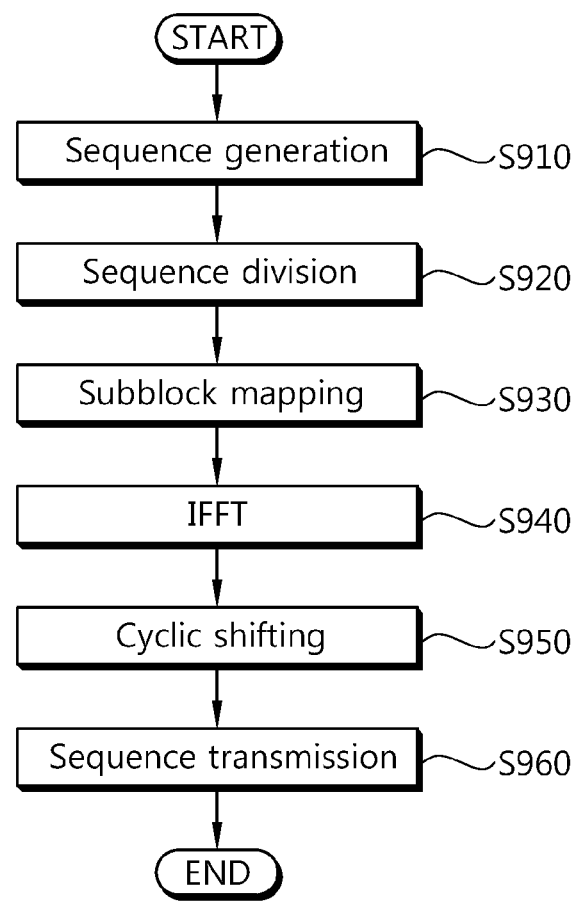
FIG. 19 is a flowchart showing RS transmission according to an embodiment of the present invention.

FIG. 19 is a flowchart showing RS transmission according to an embodiment of the present invention. An RS sequence is generated (step S910). The RS sequence is divided on a subblock basis (step S920). The divided RS sequence segments are mapped to respective subblocks (step S930). IFFT is performed on the mapped RS sequence segments (step S940). Cyclic shifting is applied to signals subjected to IFFT (step S950). A cyclically shifted sequence is transmitted (step S960). A cyclic shift in a time domain is equivalent to a phase shift in a frequency domain. A phase shift of the base sequence $r_{u,v}(n)$ in the frequency domain can be expressed by Equation 18 below.

$$r_{u,v}^{(\alpha)}(n) = e^{j\alpha n} r_{u,v}(n), 0 \leq n \leq Nf \quad \text{[Equation 18]}$$

Herein, α denotes a phase shift value, and Nf denotes an FFT size used when performing IFFT.

Figure 20:
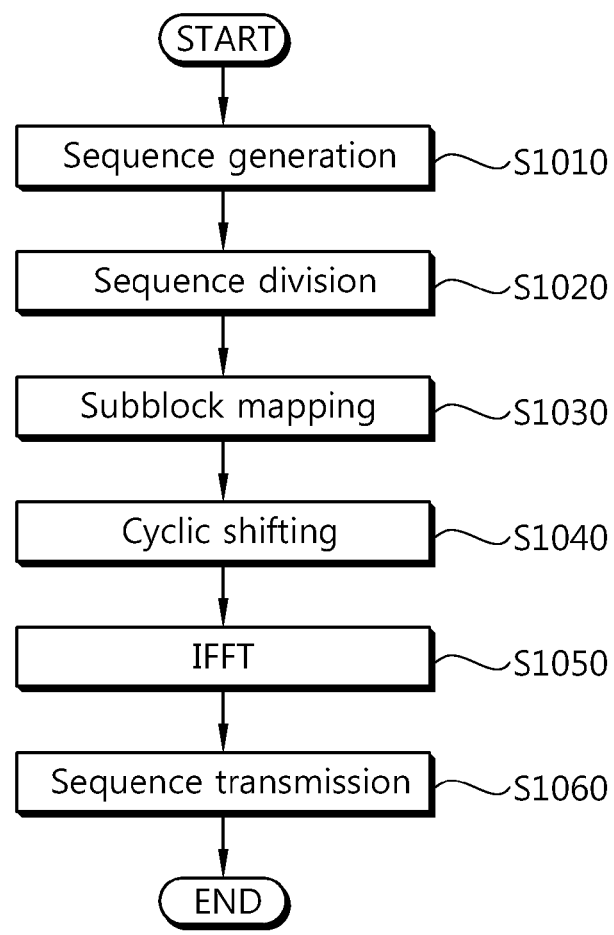
FIG. 20 is a flowchart showing RS transmission according to an embodiment of the present invention.

FIG. 20 is a flowchart showing RS transmission according to an embodiment of the present invention. An RS sequence is generated (step S1010). The RS sequence is divided on a subblock basis (step S1020). The divided RS sequence segments are mapped to respective subblocks (step S1030). Cyclic shifting is applied to the mapped RS sequence segments (step S1040). IFFT is performed on the cyclically shifted sequences (step S1050). The sequence subjected to IFFT is transmitted (Step S1060). A cyclic shift of the base sequence $r_{u,v}(n)$ in a frequency domain can be expressed by Equation 19 below.

$$r_{u,v}^{n_b(\alpha)}(n) = e^{j\alpha n} r_{u,v}(n), n_b(M_{SC}^{RS}/N_{sb}) \le n < (n_b+1)(M_{SC}^{RS}/N_{sb})$$ [Equation 19]

Herein, α denotes a CS amount, $n_b$ denotes a subblock number, and $N_{sb}$ denotes the number of subblocks. A low CM characteristic can be equally maintained even if cyclic shifting is performed.

Figure 21:
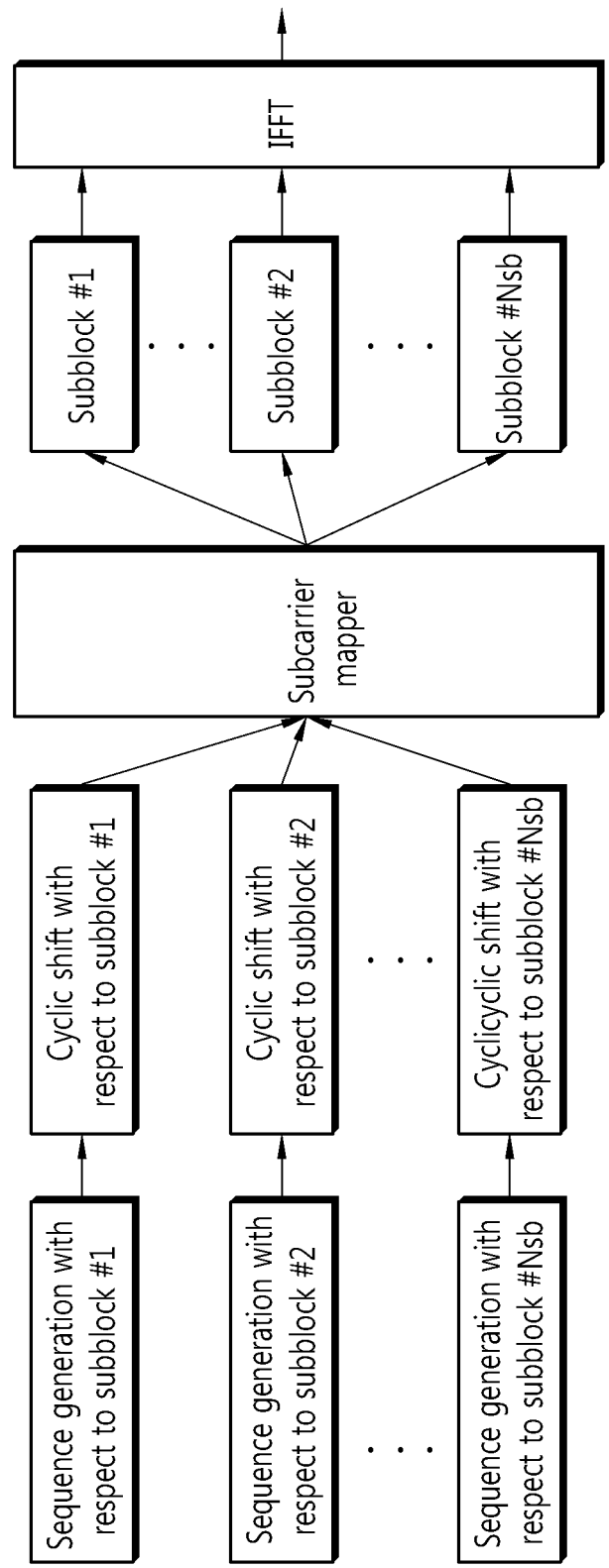
FIG. 21 is a flowchart showing RS transmission according to an embodiment of the present invention.

FIG. 21 is a flowchart showing RS transmission according to an embodiment of the present invention. A sequence is generated on a subblock basis, and is cyclically shifted on a subblock basis. In this case, different cyclic shifts may be applied on a plurality of sequences for a plurality of subblocks. When there are sequences #1 to #$N_{sb}$ for subblocks #1~#$N_{sb}$, different cyclic shifts may be applied to all sequences. Alternatively, a cyclic shift α1 may be applied to the sequences #1 to #5, and a cyclic shift α2 may be applied to the remaining sequences.

A cyclic shift applied to a sequence for each subblock can be defined in various manners. In one embodiment, the cyclic shift can be determined by using a method pre-defined between a BS and a UE. Since a UE-specific circular shift is allocated for a UL RS in 3GPP LTE, the cyclic shift can be determined on a subblock basis according to the UE-specific circular shift. Alternatively, any cyclic shift can be applied on a subblock basis. A cyclic shift offset can be applied on a subblock basis. For example, if a cyclic shift α is applied to a subblock #1 by a cyclic shift offset 2, a cyclic shift α+2 is applied to a subblock #2 and a cyclic shirt α+4 is applied to a subblock #3. In addition, cyclic shift hopping in which different cyclic shifts are applied for each slot or subframe can be applied between subblocks. In another embodiment, a BS can instruct a subblock-based cyclic shift to a UE. This can be reported by using system information, radio resource control (RRC) signaling, and/or PDCCH.

A multiple carrier system can apply the cyclic shift for each carrier. In addition, when a plurality of subblocks are allocated to the carrier, a cyclic shift can be applied for each subblock. The cyclic shift can be defined by the aforementioned method of determining the cyclic shift for each carrier and for each subblock in the carrier. For example, the cyclic shift can be determined between carriers by using a predetermined method, and can be determined by using signaling for each subblock in the carrier. Assume that there are the four subblocks mentioned above, and the base sequence of FIG. 17 is used. When cyclic shifts 0, 2, 4, and 6 are applied to the respective subblocks, CM becomes 2.4290 dB, and thus there is a gain of about 292% in comparison with 7.0808 dB of the conventional technique.

A CS value can be determined circularly. For example, assume that the number of subblocks is 8, and the number of available cyclic shifts is 12. When a cyclic shift offset is 2, cyclic shifts can be applied such as 0, 2, 4, 6, 8, 10, 0, 2 to subblocks #1 to #8.

In case of the multiple carrier system, subblocks can be respectively related to carriers. For example, assume that there are two carriers and carrier numbers $n_{cr}$ of the respective carriers are #1 and #2. A cyclic shift applied to each subblock can be determined on the basis of the carrier number. For example, the cyclic shift for each subblock can be determined such as (Noff*$n_{cr}$) or {(Noff*$n_{cr}$)mod($N_{CS}$)}. Herein, Noff denotes a cyclic shift offset, and $N_{CS}$ denotes the number of available cyclic shifts.

When clustered SC-FDMA is used in intra-carriers and Nx SC-FDMA is used in inter-carriers, a carrier number and a subblock number of each carrier can be used together to determine the cyclic shift. For example, if the total number of subblocks included in one carrier is $N_{sb}$, the total number of carriers is $N_{cr}$, a subblock number is $n_{sb}$, and a carrier number is $n_{cr}$, then the cyclic shift can be defined as ($N_{sb}$*$n_{cr}$+$n_{sb}$) or {($N_{sb}$*$n_{cr}$+$n_{sb}$)mod($N_{CS}$)}. For example, if $N_{sb}$=4, $N_{cr}$=2, $n_{sb}$ is in the range of 0 to 3, $n_{cr}$ is in the range of 0 to 1, and the number of available cyclic shifts is 12, then CS values are sequentially set to 0, 1, 2, 3, 4, 5, 6, 7 in an ascending order of the carrier number and the subblock number. If a cyclic shift offset Noff is defined, the cyclic shift can be defined as {(($N_{sb}$*$n_{cr}$+$n_{sb}$)*Noff)mod($N_{CS}$)}. In the above example, the CS values are determined such as 0, 2, 4, 6, 8, 10, 0, 2. In another embodiment, the subblock number may be contiguously given irrespective of the carrier instead of being independently given for each carrier. For example, if the subblock number of the carrier #0 is defined as 0, 1, 2, and 3 and the subblock number of the carrier #1 is defined as 4, 5, 6, and 7, then the cyclic shift can be given such as ($n_{sb}$*Noff)mod($N_{CS}$). That is, if Noff=1, a CS amount can be sequentially given such as 0, 1, 2, 3, 4, 5, 6, 7, and if Noff=2, the CS amount can be given such as 0, 2, 4, 6, 8, 10, 0, 2.

If $N_{cr}$ denotes the number of carriers and $n_{cr}$ ($n_{cr}$=0, 1, . . . , $N_{cr}$−1) denotes the carrier number, the CS index Ics of Equation 15 can be re-defined as Equation 20 below.

$$Ics = (Ia+Ib+I(n_s)+n_{cr}) \bmod N_{CS}$$ [Equation 20]

Herein, Ia is determined by the cell-specific CS parameter, Ib denotes the UE-specific CS parameter, I($n_s$) denotes the hopping CS parameter obtained by Equation 16, and $N_{CS}$ denotes the number of available CSs per subblock. Ia can be obtained by using system information, and Ib can be obtained from a UL grant.

If $N_{sb}$ denotes the total number of subblocks and $n_{sb}$ ($n_{sb}$=0, 1, . . . , $N_{sb}$−1) denotes a subblock number, then the CS index Ics of Equation 15 can be re-defined as Equation 21 below.

$$Ics = (Ia+Ib+I(n_s)+n_{sb}) \bmod N_{CS}$$ [Equation 21]

Alternatively, Equation 20 and Equation 21 above can be combined into Equation 22 below.

$$Ics = (Ia+Ib+I(n_s)+n_{cr}N_{cr}+n_{sb}) \bmod N_{CS}$$ [Equation 22]

A cyclically shifted sequence can be used as a masking sequence. In addition to the cyclically shifted sequence, the masking sequence may be any sequence such as a Hadamard sequence, a pseudo-random (PN) sequence, a Gold sequence, etc. The masking sequence may be determined to be used according to a subblock configuration, and the masking sequence can be masked to an RS sequence. The masking sequence may use a part or entirety of the RS sequence. Information on the masking sequence may be reported by a BS to a UE.

By using a decreased PAPR/CM characteristic, the proposed sequence can be applied to not only an RS but also other control signals or traffic data. A masking sequence different from the RS can be used for masking of the traffic data. A masking sequence set used for the traffic data can be pre-determined, and the masking sequence can be selected so that it has a minimum PAPR/CM characteristic when the masking sequence set is applied. In UL transmission, the UE can report information on the masking sequence selected from the masking sequence set to the BS.

A time-domain phase shift is equivalent to a frequency-domain cyclic shift, and a frequency-domain cyclic shift is equivalent to a time-domain phase sequence. Thus, the technical features of the present invention are applicable to both the frequency/time domains. When different-domain cyclic shifts are applied per subblock, a cyclic shift of the base sequence $r_{u,v}(n)$ of Equation 3 can be re-defined in the frequency domain by Equation 23 below.

$$r_{u,v}(n)x_q((n+\Delta f) \mod N), 0 \leq n < M_{SC}^{RS} \quad \text{[Equation 23]}$$

Herein, $\Delta f$ denotes a CS value, N denotes a length of $x_q$, and $M^{RS}_{sc}$ denotes a length of an RS. $\Delta f$ may be an absolute frequency value, and may be a relative frequency value for a CS value of a specific subblock.

A phase modulation may be performed on a subgroup basis. When a phase modulation p is applied to the base sequence $r_{u,v}(n)$, the phase-modulated sequence can be expressed by Equation 24 below.

$$r_{u,v}^P(n) = e^{j2\pi p}(n) \quad \text{[Equation 24]}$$

As described above, 3GPP LTE applies hopping to a UL RS. The hopping can be classified into per-slot cyclic shift hopping, per-slot group hopping, and per-slot base sequence hopping in a group. The three types of hopping can be applied on a subblock and/or carrier basis. Assume that there are two subblocks and slot numbers are 0 to 19. A cyclic shift is applied to a $1^{st}$ subblock in a slot number order such as 0, 1, 2, 3, 4, 5, 6, 7, 8, 9, 10, 11, 0, 1, 2, 3, 4, 5, 6, 7, and a cyclic shift is applied to a $2^{nd}$ subblock in a slot number order such as 0, 10, 7, 1, 2, 11, 9, 3, 4, 8, 6, 5, 7, 4, 1, 0, 5, 11, 7, 6.

A hopping pattern can be differently applied on a subblock and/or carrier basis by using various methods. In 3GPP LTE, as shown in Equation 10 and Equation 13, an m-sequence used in a length-31 Gold sequence is initialized according to a cell ID and a sequence shift pattern $f_{ss}$. If there are $N_{sb}$ subblocks and a subblock number is denoted by $n_{sb}$ (where $n_{sb}=0, 1, \ldots, N_{sb}-1$), the initialization of the $2^{nd}$ m-sequence of Equation 13 can be re-defined by Equation 25 below.

$$c_{init} = \left\lfloor \frac{N_{sb}N_{cell\_ID} + n_{sb}}{30} \right\rfloor \cdot 2^5 + f_{ss} \quad \text{[Equation 25]}$$

Herein, a CS pattern may be $f_{ss}=(N_{sb}N_{cell\_ID}+n_{sb}) \mod 30$

If there are $N_{cr}$ carriers and a carrier number is denoted by $n_{cr}$, (where $n_{cr}=0, 1, \ldots, N_{cr}-1$), the initialization of the $2^{nd}$ m-sequence of Equation 13 can be re-defined by Equation 26 below.

$$c_{init} = \left\lfloor \frac{N_{cr}N_{cell\_ID} + n_{cr}}{30} \right\rfloor \cdot 2^5 + f_{ss} \quad \text{[Equation 26]}$$

Herein, the CS pattern may be $f_{ss}=(N_{cr}N_{cell\_ID}+n_{cr}) \mod 30$

Alternatively, the initialization of the $2^{nd}$ m-sequence can be defined by combining a subblock and a carrier according to Equation 27 below.

$$c_{init} = \left\lfloor \frac{N_{cr}N_{sb}N_{cell\_ID} + N_{cr}n_{sb}n_{cr}}{30} \right\rfloor \cdot 2^5 + f_{ss} \quad \text{[Equation 27]}$$

Herein the CS pattern may be $f_{ss}=(N_{cr}N_{sb}N_{cell\_ID}+N_{cr}n_{sb}+n_{cr}) \mod 30$ A different sequence group can be allocated between subblocks. For example, when using 4 subblocks, it is possible to allocate a sequence group having a constant offset with respect to a $1^{st}$ subblock. For example, a $1^{st}$ sequence group can be allocated to the $1^{st}$ subblock, a $2^{nd}$ sequence group can be allocated to a $2^{nd}$ subblock, and a $3^{rd}$ sequence group can be allocated to a $3^{rd}$ subblock. In a multiple carrier system, different sequence groups can be allocated for each subblock in association with each carrier. In an Nx SC-FDMA system in which one subblock correspond to each carrier, if four carriers have carrier numbers 0, 1, 2, and 3, the sequence groups can be allocated such as 0, 1, 2, and 3.

A sequence applied with a different root index q can be used for each subblock. For example, assume that a clustered DFT-s OFDM system includes four subblocks each of which has a size of 48. Sequences having a length of 48 can be generated by using a different root index for each subblock. A $1^{st}$ subblock can use q=4, a $2^{nd}$ subblock can use q=6, a $3^{rd}$ subblock can use q=8, and a $4^{th}$ subblock can use q=10. According to the conventional technique, a CM value is 6.7851 dB. However, when applying the different root index, the CM value is 2.8889 dB, and thus a CM gain of about 235% can be obtained.

Among a plurality of subblocks, at least two or more subblocks can have different sizes. If the subblock size differs, a sequence for the subblock has a different size, and thus CM may decrease. For example, assume that a DFT size is 384 and there are four subblocks in the clustered DFT-s OFDM system. If the four subblocks are divided by the same size of 96, CM is 6.3715 dB. If the subblocks respectively have a size of 48, 96, 72, and 168, CM is 3.0656 dB, and thus a CM gain of about 220% can be obtained. If the subblocks respectively have a size of 48, 144, 96, and 196, CM is 3.6937 dB, and thus a CM gain of about 172% can be obtained.

Among a plurality of subblocks, at least two or more subblocks can have different sizes. Each subblock can use the same sequence group. If subblocks have different sizes, sequences having different lengths can be used in the same sequence group for each subblock. For example, when a $1^{st}$ subblock size is 36, a $2^{nd}$ subblock size is 12, a $3^{rd}$ subblock size is 24, and a $4^{th}$ subblock size is 48, then the same sequence group can be allocated to the $1^{st}$ to $4^{th}$ subblocks.

II. Signal Transmission in Multiple Carrier System

Hereinafter, how to apply the present invention to the multiple carrier system will be described in greater detail.

At present, the 3GPP LTE system considers only a single carrier, and uses only one cell ID. In the 3GPP LTE, a DL synchronization signal, a PCFICH, and a DL RS signal are determined based on the cell ID. If a BS transmits the DL RS simultaneously through a plurality of carriers, the same DL RS can be transmitted for each carrier due to a one-to-one relation between the DL RS and the cell ID. Since the same waveform is repeated in a frequency domain, a PAPR characteristic may deteriorate in a time domain.

Considering a system having two transmit antennas and up to 5 carriers, Table 5 below shows CM when carriers having the same cell ID transmit the same DL RS.

TABLE 5

| carriers | | | 1 | 2 | 3 | 4 | 5 |
|---|---|---|---|---|---|---|---|
| | 1Tx | | 4.02 | 6.57 | 8.59 | 10.1 | 11.32 |
| 2Tx | Rank1 | ANT1 | 4.02 | 6.52 | 8.58 | 10.1 | 11.32 |
| | | ANT2 | 3.98 | 6.56 | 8.59 | 10.1 | 11.34 |
| | Rank2 | ANT1 | 3.98 | 6.52 | 8.59 | 10.1 | 11.35 |
| | | ANT2 | 3.98 | 6.52 | 8.61 | 10.1 | 11.35 |
| | 1Tx | | 4.02 | 4.12 | 4.27 | 4.42 | 4.58 |
| 2Tx | Rank1 | ANT1 | 3.99 | 4.17 | 4.37 | 4.60 | 4.82 |
| | | ANT2 | 3.99 | 4.17 | 4.37 | 4.59 | 4.82 |
| | Rank2 | ANT1 | 4.00 | 4.17 | 4.38 | 4.58 | 4.81 |
| | | ANT2 | 4.01 | 4.16 | 4.37 | 4.57 | 4.82 |
| | 1Tx | | 4.00 | 4.32 | 4.73 | 5.12 | 5.52 |
| 2Tx | Rank1 | ANT1 | 4.00 | 4.43 | 4.94 | 5.45 | 5.95 |
| | | ANT2 | 4.00 | 4.44 | 4.96 | 5.44 | 5.95 |
| | Rank2 | ANT1 | 4.00 | 4.43 | 4.93 | 5.44 | 5.95 |
| | | ANT2 | 4.00 | 4.44 | 4.95 | 5.46 | 5.95 |
| | 1Tx | | 4.00 | 4.72 | 5.54 | 6.28 | 6.97 |
| 2Tx | Rank1 | ANT1 | 4.00 | 4.89 | 5.86 | 6.71 | 7.50 |
| | | ANT2 | 3.99 | 4.88 | 5.84 | 6.72 | 7.51 |
| | Rank2 | ANT1 | 4.02 | 4.88 | 5.84 | 6.71 | 7.50 |
| | | ANT2 | 4.01 | 4.88 | 5.85 | 6.73 | 7.48 |

It can be seen that the more the number of carriers, the greater the CM.

To improve the PAPR/CM characteristic, a phase shift is performed on a subblock and/or carrier basis. The same sequence can be transmitted in every subblock, or a sequence divided from one long sequence can be transmitted in every subblock. The phase shift may be equivalent to phase inversion (e.g., multiplying the sequence by +1 or −1) or may be achieved through phase modulation.

Figure 22:
FIG. 22 shows subblock-based phase modulation.
Figure 22:
Figure 22:

FIG. 22 shows subblock-based phase modulation. Assume that there are $N_{sb}$ subblocks. Phase shifts $p(1), p(2), \ldots, p(N_{sb})$ are applied to respective subblocks. For example, if $N_{sb}$=3, the phase shifts may be p(1)=1, p(2)=1, p(3)=−1. If $N_{sb}$=4, the phase shifts may be p(1)=1, p(2)=1, p(3)=1, p(4)=−1. If $N_{sb}$=5, the phase shifts may be p(1)=1, p(2)=1, p(3)=1, p(4)=−1, p(5)=1.

A sequence used in one subblock is subjected to phase modulation with the same phase shift $p(n_{sb})$ (where $n_{sb}$ is a subblock number). For example, when there is an RS denoted by r(0) . . . r(Nrs−1) (where Nrs is a length of the RS) and traffic data denoted by d(0), . . . , d(Nd−1) (where Nd is the total number of traffic data symbols in a subblock), the RS and/or the traffic data can be subjected to phase modulation with the phase shift $p(n_{sb})$. This is because backward compatibility with the legacy UE can be satisfied when each subblock is modulated with the same phase shift value.

IFFT may be performed on a subblock basis, or may be performed on a plurality of subblocks.

The phase modulation (or phase shift) may be performed at any time, i.e., before DFT processing, after the DFT processing and before IFFT processing, and during the IFFT processing. The phase modulation may be performed in any domain, i.e., a time domain or a frequency domain.

Figure 23:
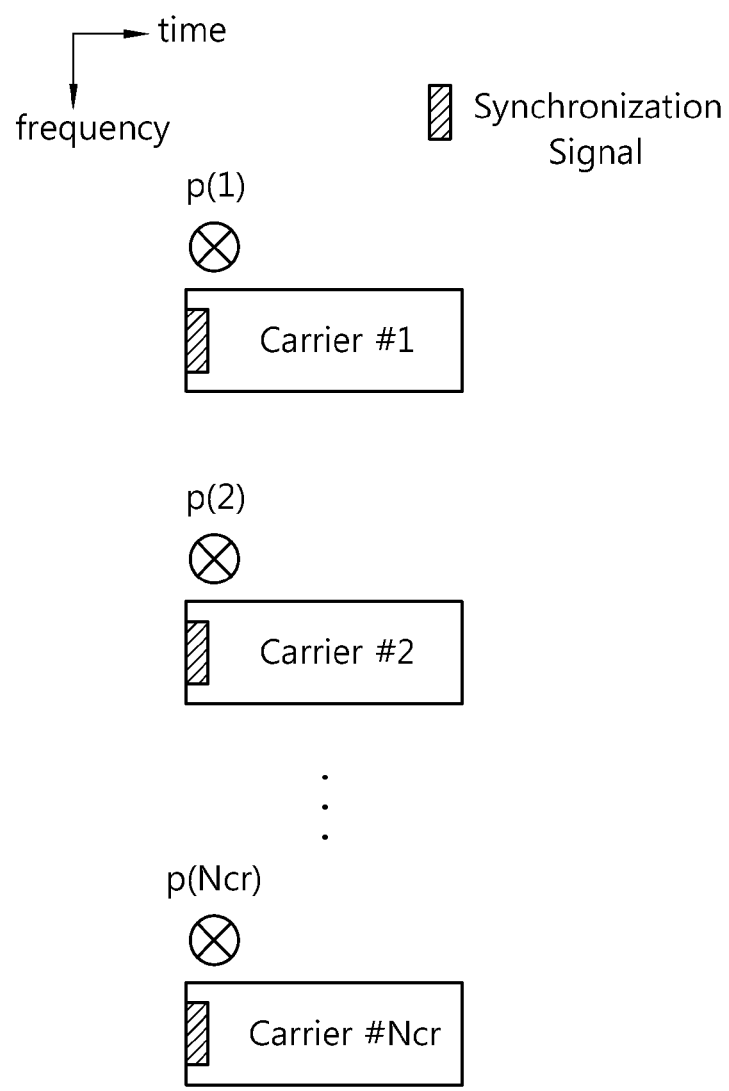
FIG. 23 shows an example in which carrier-based phase modulation is applied to a synchronization signal.

FIG. 23 shows an example in which carrier-based phase modulation is applied to a synchronization signal. Assume that there are $N_{cr}$ carriers, and a synchronization signal is transmitted on one OFDM symbol in a subframe. Phase shifts $p(1), p(2), \ldots, p(N_{cr})$ are applied to the synchronization signal for each carrier. The synchronization signal used in one carrier is subjected to phase modulation with the same phase shift $p(n_{cr})$ (where $n_{cr}$ is a carrier number).

The phase modulation may be performed across all subframes, or may be performed on an OFDM symbol basis or on a slot basis.

Figure 24:
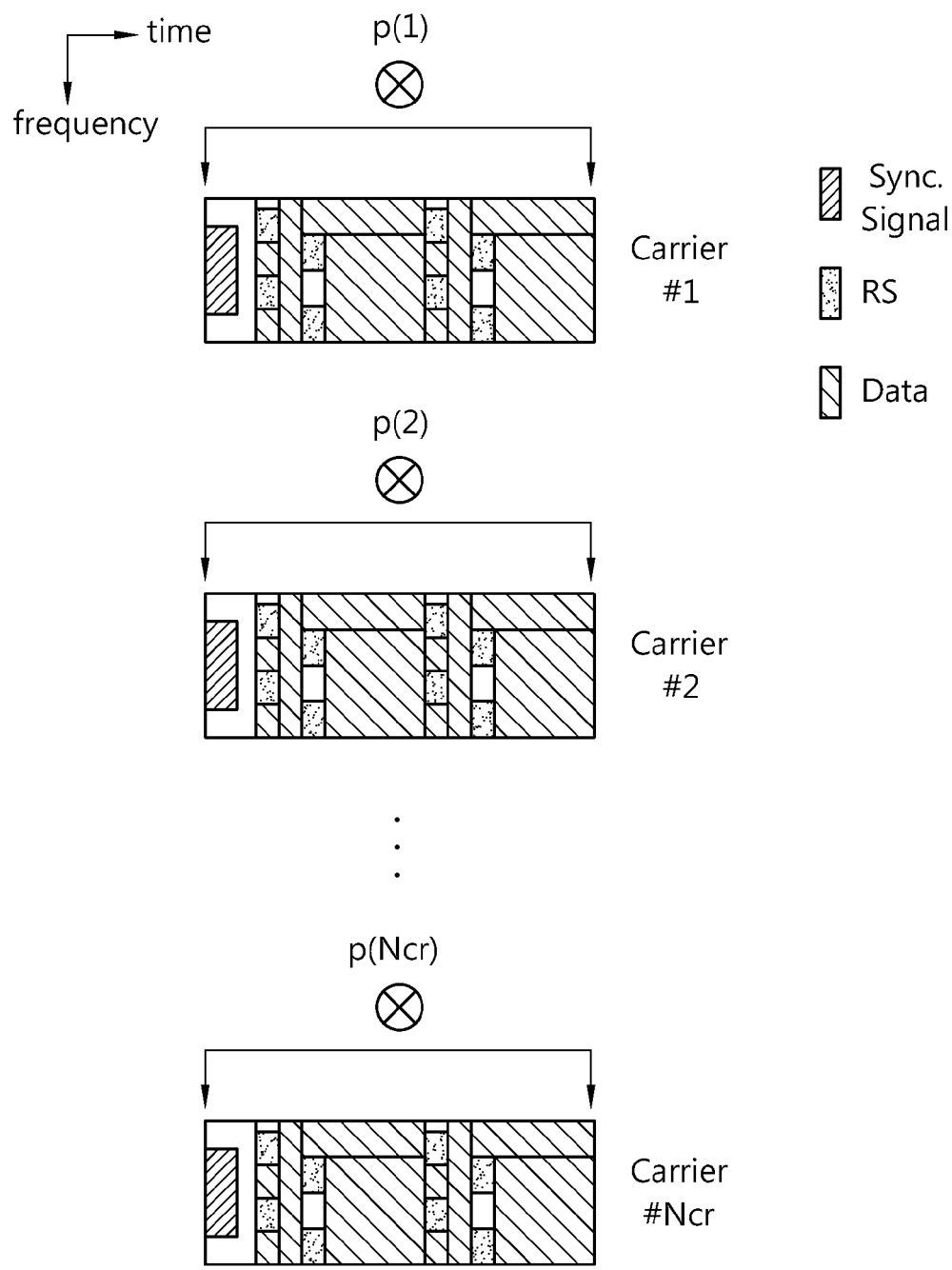
FIG. 24 shows an example in which carrier-based phase modulation is applied to a DL signal.

FIG. 24 shows an example in which carrier-based phase modulation is applied to a DL signal. Assume that there are $N_{cr}$ carriers, and a synchronization signal, a DL RS, and data are transmitted in a subframe by being multiplexed. Phase shifts $p(1), p(2), \ldots, p(N_{cr})$ are applied to the synchronization signal, the DL RS, and the data for each carrier. The synchronization signal, the DL RS, and the data used in one carrier are subjected to phase modulation with the same phase shift $p(n_{cr})$ (where $n_{cr}$ is a carrier number).

Figure 25:
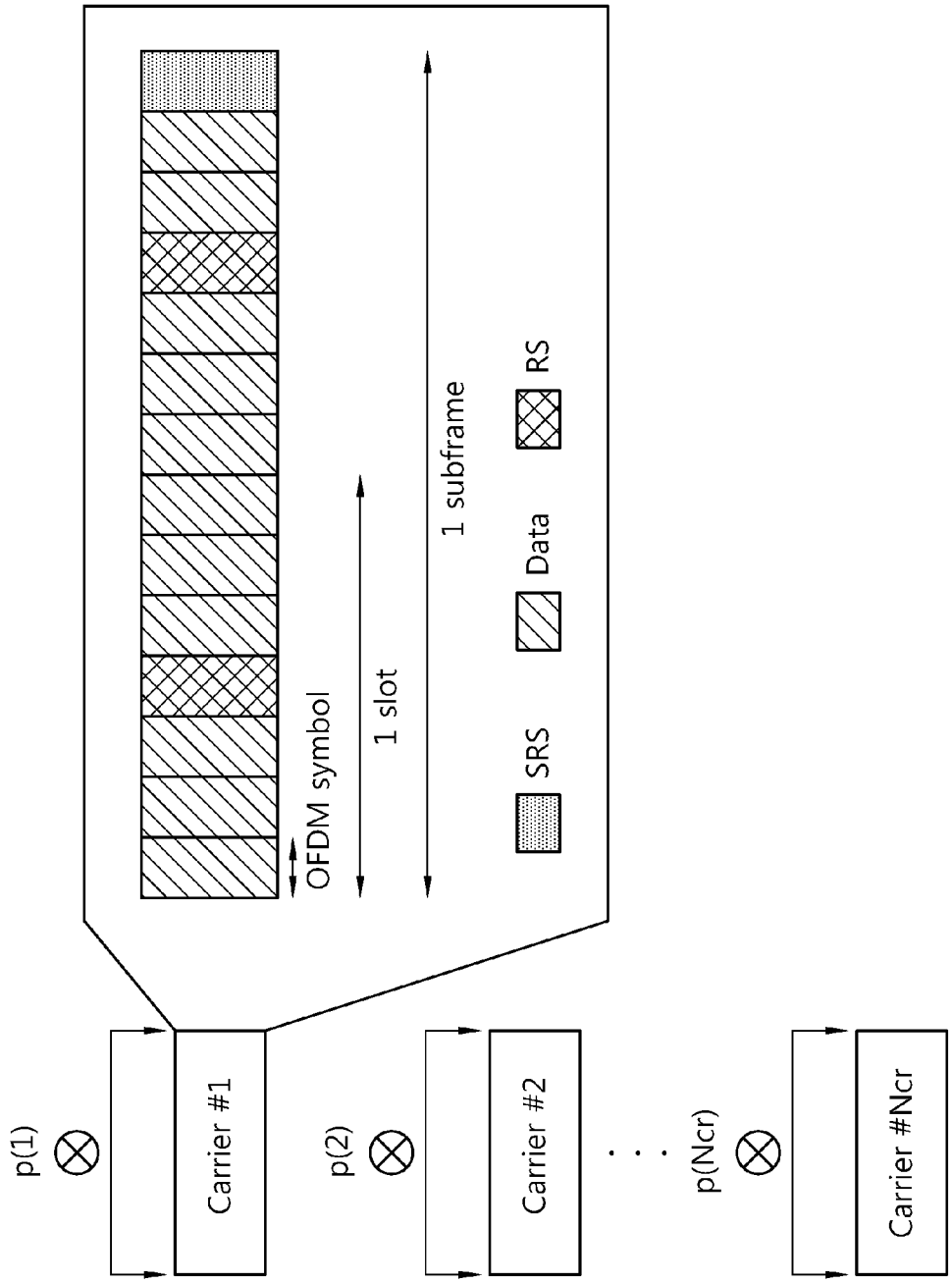
FIG. 25 shows an example in which carrier-based phase modulation is applied to a UL signal.

FIG. 25 shows an example in which carrier-based phase modulation is applied to a UL signal. Assume that there are $N_{cr}$ carriers, and a UL RS, a sounding reference signal (SRS), and data are transmitted in a subframe by being multiplexed. Phase shifts $p(1), p(2), \ldots, p(N_{cr})$ are applied to the UL RS, the SRS, and the data for each carrier. The UL RS, the SRS, and the data used in one carrier are subjected to phase modulation with the same phase shift $p(n_{cr})$ (where $n_{cr}$ is a carrier number). The same RS sequence can be used between carriers.

The phase modulation may be applied only to the UL RS, and may be not applied to the data.

Even if the same sequence is used for each carrier or subblock, a low PAPR/CM characteristic can be maintained through the phase modulation.

Figure 26:
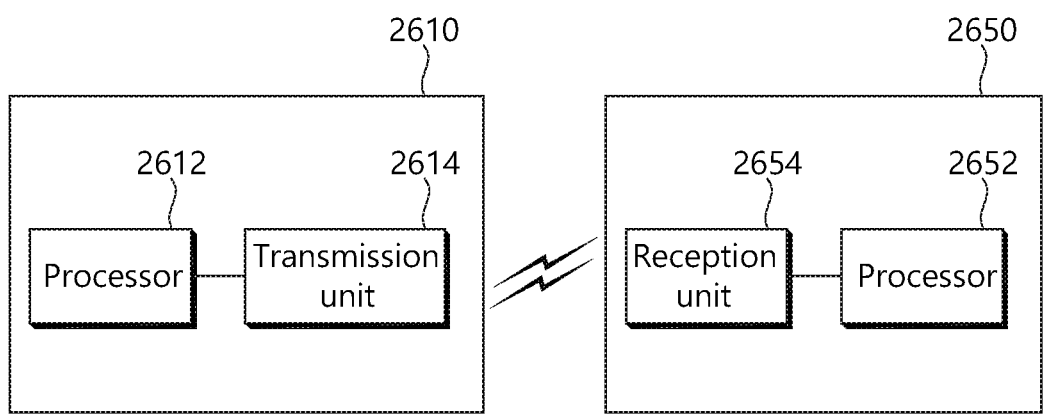
FIG. 26 shows a transmitter and a receiver according to an embodiment of the present invention.

FIG. 26 shows a transmitter and a receiver according to an embodiment of the present invention. In DL, a transmitter 2610 may be a part of a BS, and a receiver 2650 may be a part of a UE. In UL, the transmitter 2610 may be a part of the UE, and the receiver 2650 may be a part of the BS.

The transmitter 2610 includes a processor 2612 and a transmission unit 2614. The processor 2612 is coupled to the transmission unit 2614, and generates a sequence. Further, the processor 2612 processes the sequence for each subblock and transmits the sequence via the transmission unit 2614. The processor 2612 can implement subblock-based sequence processing and/or carrier-based sequence processing according to the aforementioned embodiment of the present invention. The transmitter 2610 can support any multiple access schemes such as DFT-s OFDM, clustered DFT-s OFDM, and/or chunk-specific DFT-s OFDM.

The receiver 2650 includes a processor 2652 and a reception unit 2654. The reception unit 2654 receives a sequence. The processor 2652 is coupled to the reception unit 2654, and processes the sequence received from the reception unit 2654. For example, when receiving an RS sequence, the processor 2652 can perform channel estimation by using the RS sequence. The processors 2612 and 2652 may include an application-specific integrated circuit (ASIC), a separate chipset, a logic circuit, and/or a data processing unit.

Although a series of steps or blocks of a flowchart are described in a particular order when performing methods in the aforementioned exemplary system, the steps of the present invention are not limited thereto. Thus, some of these steps may be performed in a different order or may be concurrently performed. Those skilled in the art will understand that these steps of the flowchart are not exclusive, and that another step can be included therein or one or more steps can be omitted without having an effect on the scope of the present invention.

The aforementioned embodiments include various exemplary aspects. Although all possible combinations for representing the various aspects cannot be described, it will be understood by those skilled in the art that other combinations are also possible. Therefore, all replacements, modifications, and changes should fall within the spirit and scope of the claims of the present invention.

What is claimed is:

1. A method of transmitting data by a user equipment (UE) in a wireless communication system, the method comprising:
   generating a single reference signal,
   wherein a length of the single reference signal is equal to the total number of subcarriers in a first set of resource blocks and a second set of resource blocks;
   mapping the generated single reference signal to the first set of resource blocks and the second set of resource blocks,
   wherein the first set of resource blocks and the second set of resource blocks are not contiguous with each other in a frequency domain,
   wherein all subcarriers within the first set of resource blocks are contiguous, and
   wherein all subcarriers within the second set of resource blocks are contiguous; and
   transmitting the mapped single reference signal.

2. The method of claim 1, further comprising receiving an uplink grant allocating the first set of resource blocks and the second set of resource blocks for a physical uplink shared channel (PUSCH) transmission.

3. The method of claim 1, wherein the single reference signal is generated by shifting a base sequence cyclically.

4. The method of claim 1, wherein the first set of resource blocks and the second set of resource blocks respectively include one or more consecutive resource block groups, wherein one resource block group of the one or more consecutive resource block groups includes at least one resource block.

5. The method of claim 1, wherein one resource block includes 12 consecutive subcarriers.

6. The method of claim 1, wherein the first set of resource blocks and the second set of resource blocks respectively include a different number of resource block groups.

7. The method of claim 1, wherein the single reference signal is mapped to a fourth single carrier frequency division multiple access (SC-FDMA) symbol in each slot in a subframe, the subframe including 2 slots and each slot including 7 SC-FDMA symbols.

8. The method of claim 1, wherein the single reference signal is mapped to a third SC-FDMA symbol in each slot in a subframe, the subframe including 2 slots and each slot including 6 SC-FDMA symbols.

9. The method of claim 1, further comprising:
   mapping data to the first set of resource blocks and the second set of resource blocks; and
   transmitting the mapped data.

10. A user equipment transmitting data in a wireless communication system, the user equipment comprising:
    a radio frequency (RF) unit configured to transmit or receive a radio signal; and
    a processor, coupled to the RF unit, and configured to:
    generate a single reference signal,
    wherein a length of the single reference signal is equal to the total number of subcarriers in a first set of resource blocks an a second set of resource blocks;
    map the generated single reference signal to the first set of resource blocks and the second set of resource blocks,
    wherein the first set of resource blocks and the second set of resource blocks are not contiguous with each other in a frequency domain,
    wherein all subcarriers within the first set of resource blocks are contiguous, and
    wherein all subcarriers within the second set of resource blocks are contiguous; and
    transmit the mapped single reference signal.

11. The user equipment of claim 10, wherein the processor is further configured to receive an uplink grant allocating the first set of resource blocks and the second set of resource blocks for a physical uplink shared channel (PUSCH) transmission.

12. The user equipment of claim 10, wherein the single reference signal is generated by shifting a base sequence cyclically.

13. The user equipment of claim 10, wherein the first set of resource blocks and the second set of resource blocks respectively include one or more consecutive resource block groups, wherein one resource block group of the one or more consecutive resource block groups include at least one resource block.

14. The user equipment of claim 10, wherein one resource block includes 12 consecutive subcarriers.

15. The user equipment of claim 10, wherein the first set of resource blocks and the second set of resource blocks respectively include a different number of resource block groups.

16. The user equipment of claim 10, wherein the single reference signal is mapped to a fourth single carrier frequency division multiple access (SC-FDMA) symbol in each slot in a subframe, the subframe including 2 slots and each slot including 7 SC-FDMA symbols.

17. The user equipment of claim 10, wherein the single reference signal is mapped to a third SC-FDMA symbol in each slot in a subframe, the subframe including 2 slots and each slot including 6 SC-FDMA symbols.

18. The method of claim 3, wherein the base sequence is determined by a sequence group number u and a base sequence number v.

19. The method of claim 18, wherein the sequence group number u and the base sequence number v are identical for the generated reference signal sequence, which is divided into the first set of resource blocks and the second set of resource blocks.

20. The user equipment of claim 10, wherein the base sequence is determined by a sequence group number u and a base sequence number v.

21. The user equipment of claim 20, wherein the sequence group number u and the base sequence number v are identical for the generated reference signal sequence, which is divided into the first set of resource blocks and the second set of resource blocks.

* * * * *